(12) United States Patent
Minami et al.

(10) Patent No.: US 11,111,968 B2
(45) Date of Patent: Sep. 7, 2021

(54) CLUTCH UNIT AND VEHICLE

(71) Applicant: YAMAHA HATSUDOKI KABUSHIKI KAISHA, Iwata (JP)

(72) Inventors: Kengo Minami, Iwata (JP); Yoshiki Terashima, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 188 days.

(21) Appl. No.: 16/455,169

(22) Filed: Jun. 27, 2019

(65) Prior Publication Data
US 2019/0338811 A1    Nov. 7, 2019

Related U.S. Application Data

(63) Continuation-in-part of application No. PCT/JP2017/047196, filed on Dec. 28, 2017.

(30) Foreign Application Priority Data

Dec. 29, 2016  (JP) .............................. JP2016-257436

(51) Int. Cl.
*F16D 23/12*  (2006.01)
*F16D 13/75*  (2006.01)
*F16D 28/00*  (2006.01)

(52) U.S. Cl.
CPC ........... *F16D 23/12* (2013.01); *F16D 13/752* (2013.01); *F16D 28/00* (2013.01)

(58) Field of Classification Search
CPC .... F16D 28/00; F16D 23/12; F16D 2023/123; F16D 2023/126; F16D 13/75; F16D 13/752
See application file for complete search history.

(56) References Cited

U.S. PATENT DOCUMENTS

| 4,671,400 A | 6/1987 | Grunberg et al. |
| 4,750,596 A | 6/1988 | Grunberg et al. |
| 5,678,671 A | 10/1997 | Leimbach et al. |
| 6,269,926 B1 | 8/2001 | Lemoine et al. |
| 10,563,703 B2 | 2/2020 | Kim |
| 2006/0101603 A1 | 5/2006 | Yagi |
| 2006/0169562 A1* | 8/2006 | Kosugi ................... F16D 28/00 192/83 |

(Continued)

FOREIGN PATENT DOCUMENTS

| CN | 1991193 A | 7/2007 |
| CN | 103097756 A | 5/2013 |

(Continued)

*Primary Examiner* — Richard M Lorence
(74) *Attorney, Agent, or Firm* — Rabin & Berdo, P.C.

(57) ABSTRACT

A clutch unit includes a clutch having a clutch spring, a motor that generates an actuation driving force for actuating the clutch, an output shaft that transfers the clutch reaction force to the clutch and receives an elastic restoring force of the clutch spring as a clutch reaction force, and a spring that inputs an assist force for assisting the actuation driving force to the output shaft. In switching the clutch from an engaged state to a disengaged state, the output shaft receives the assist force before receiving the clutch reaction force, whereas in switching the clutch from the disengaged state to the engaged state, the assist force becomes zero after the clutch reaction force becomes zero.

18 Claims, 13 Drawing Sheets

(56) References Cited

U.S. PATENT DOCUMENTS

| | | | |
|---|---|---|---|
| 2013/0334004 A1* | 12/2013 | Eguchi | F16D 23/12 192/97 |
| 2020/0166109 A1 | 5/2020 | Funasugi et al. | |

FOREIGN PATENT DOCUMENTS

| CN | 103511506 A | 1/2014 |
|---|---|---|
| CN | 103836090 A | 6/2014 |
| CN | 104011416 A | 8/2014 |
| CN | 104736872 A | 6/2015 |
| CN | 105757138 A | 7/2016 |
| CN | 105934595 A | 9/2016 |
| CN | 106164521 A | 11/2016 |
| DE | 19723394 A1 | 12/1997 |
| EP | 0220092 A1 | 4/1987 |
| EP | 0220092 B1 | 12/1989 |
| EP | 2336587 A1 | 6/2011 |
| EP | 2431626 A1 | 3/2012 |
| EP | 2899420 A2 | 7/2015 |
| EP | 3104040 A1 | 12/2016 |
| GB | 2313885 A | 12/1997 |
| JP | S60-241526 A | 11/1985 |
| JP | S62-98032 A | 5/1987 |
| JP | S63-63225 U | 4/1988 |
| JP | H1081158 A | 3/1998 |
| JP | 2000-501826 A | 2/2000 |
| JP | 2000201826 A | 7/2000 |
| JP | 2002-309610 A | 10/2002 |
| JP | 2003-528273 A | 9/2003 |
| JP | 2006-170227 A | 6/2006 |
| JP | 2006-214478 A | 8/2006 |
| JP | 2012-062966 A | 3/2012 |
| JP | 2013-133887 A | 7/2013 |
| JP | 2015-072024 A | 4/2015 |
| JP | 2015-148258 A | 8/2015 |
| KR | 101304193 B1 | 9/2013 |
| WO | 2016024557 A1 | 2/2016 |

\* cited by examiner

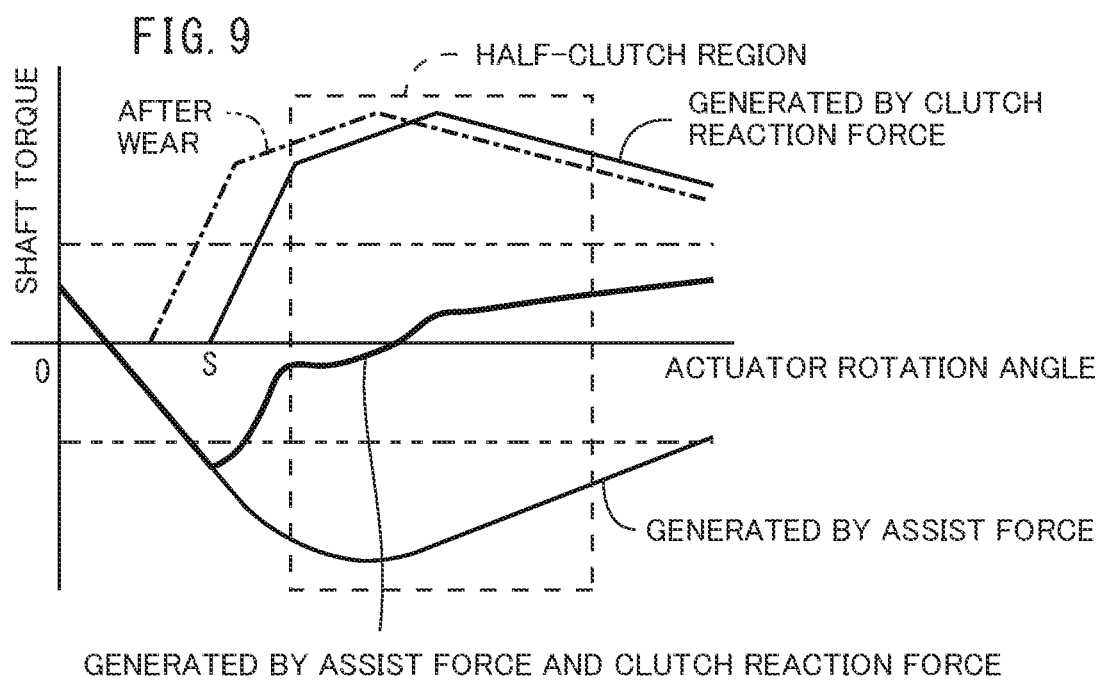

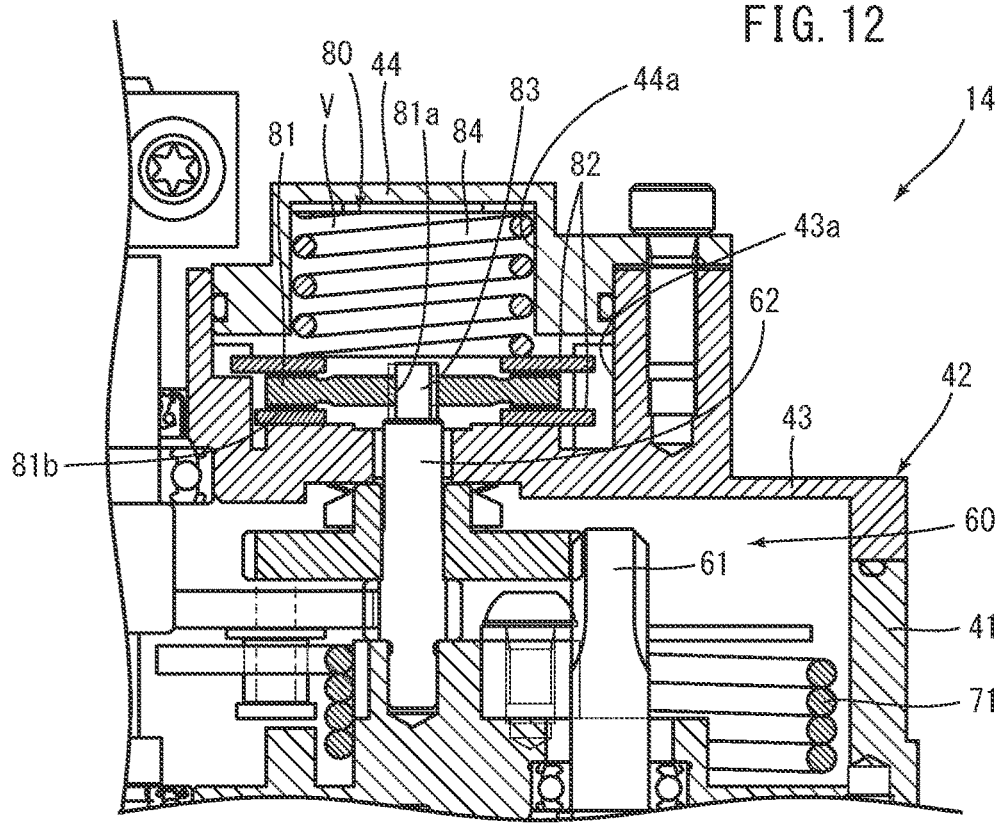
FIG. 12
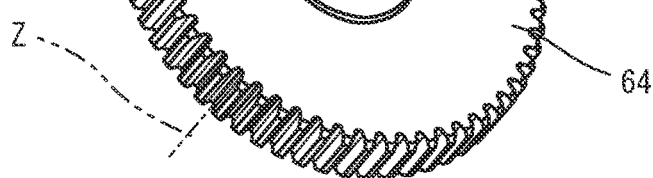
FIG. 13

CLUTCH UNIT AND VEHICLE

CROSS-REFERENCES TO RELATED APPLICATIONS

The present application is a continuation-in-part application of International Application No. PCT/JP2017/047196, filed on Dec. 28, 2017, and having the benefit of the earlier filing date of Japanese Application No. 2016-257436, filed Dec. 29, 2016. The content of each of the identified applications is incorporated herein by reference in its entirety.

TECHNICAL FIELD

The present teaching relates to a clutch unit capable of transferring and interrupting a torque.

BACKGROUND ART

A known clutch unit includes a clutch and an actuator that generates a force for actuating the clutch (hereinafter referred to as an actuation driving force). Such a clutch unit is capable of switching the clutch between an engaged state and a disengaged state by using an actuation driving force generated by the actuator. The engaged state of the clutch refers to a state where the clutch transfers a torque, and the disengaged state of the clutch refers to a state where a torque is interrupted by the clutch.

Such a clutch unit as described above has a known configuration including an auxiliary spring member in order to assist a switching operation of the clutch by the actuator. For example, a friction clutch disclosed in Patent Document 1 (identified further on) includes a clutch engagement device, an electric motor, an elastic auxiliary means (coil spring), and a linkage.

The clutch engagement device of the friction clutch disclosed in Patent Document 1 includes a friction disc, a friction lining, a flywheel, a thrust plate, and a diaphragm. The friction lining is disposed between the flywheel and the thrust plate, and is supported on an outer peripheral portion of the friction disc. In normal operation (while no force is exerted on the diaphragm from the electric motor), a force is exerted on the thrust plate from the diaphragm. Accordingly, the friction lining is located between the flywheel and the thrust plate. Thus, the friction clutch disclosed in Patent Document 1 is in the engaged state in normal operation. In the following description, the clutch unit that is in the engaged state while no force is exerted on the clutch from the actuator will be referred to as a normally closed clutch unit.

In the friction clutch disclosed in Patent Document 1, the diaphragm is connected to an electric motor through the linkage. For example, in switching the friction clutch disclosed in Patent Document 1 from the engaged state to the disengaged state, an actuation driving force generated by the electric motor is transferred to the diaphragm through the linkage. Although detailed description is omitted, a center portion of the diaphragm is depressed by the linkage. At this time, an outer peripheral portion of the diaphragm (a portion in contact with the thrust plate) moves away from the thrust plate. Accordingly, a force exerted on the thrust plate from the diaphragm decreases. Thus, a pressing force of the thrust plate against the friction lining decreases. Consequently, the friction clutch is in a disconnected state.

In the friction clutch disclosed in Patent Document 1, the linkage is also subjected to a force generated by the elastic auxiliary means (hereinafter referred to as an assist force) in addition to the actuation driving force generated by the electric motor. Hereinafter, forces generated by the diaphragm, the electric motor, and the elastic auxiliary means in the friction clutch of Patent Document 1 will be briefly described with reference to the drawings.

FIG. 15 is a graph for describing forces generated by the diaphragm, the electric motor, and the elastic auxiliary means in the friction clutch described in Patent Document 1. In FIG. 15, the ordinate represents a force exerted on the linkage, and the abscissa represents a travel distance of the linkage (travel distance of a contact portion between the linkage and the diaphragm). In FIG. 15, a curve C1 represents a force exerted on the linkage from the diaphragm (reaction force exerted on the linkage from the diaphragm), a curve C2 represents an assist force exerted on the linkage from the elastic auxiliary means, and a curve C3 represents an actuation driving force exerted on the linkage from the electric motor. In FIG. 15, a force exerted in a direction in which the friction clutch is switched to an engaged state is represented as a positive value, and a force exerted in a direction in which the friction clutch is switched to a disengaged state is represented as a negative value. The travel distance is 0 (zero) when the friction clutch is switched to the engaged state, and increases as the linkage moves in the direction in which the friction clutch is switched to the disengaged state.

As illustrated in FIG. 15, in the friction clutch disclosed in Patent Document 1, the assist force generated by the elastic auxiliary means is input to the linkage (C2 in FIG. 15) so as to counter a reaction force exerted on the linkage from the diaphragm (C1 in FIG. 15). That is, in switching the friction clutch to the engaged state or the disengaged state by the electric motor, the assist force generated by the elastic auxiliary means is exerted on the linkage as a force of assisting the electric motor. Accordingly, in the friction clutch disclosed in Patent Document 1, the friction clutch can be switched to the engaged state or the disengaged state with a small actuation driving force.

In the clutch unit, a member that transfers a torque by a friction force (hereinafter referred to as a torque transfer member) is abraded with an operating time. In the friction clutch disclosed in Patent Document 1, the friction lining serving as a torque transfer member is abraded with an operating time.

In the friction clutch disclosed in Patent Document 1, when the friction lining is abraded, the thrust plate moves toward the flywheel. The movement of the thrust plate toward the flywheel causes the shape of the diaphragm to change. Accordingly, in switching the friction clutch to the engaged state or the disengaged state, the magnitude of a reaction force exerted on the linkage from the diaphragm varies. That is, the magnitude of the force represented by the curve C1 in FIG. 15 varies. In this case, the magnitude of an actuation driving force that needs to be generated by the electric motor (see the curve C3 in FIG. 15) also varies. When the abrasion amount of the friction lining increases so that the diaphragm deforms greatly, the actuation driving force that needs to be generated by the electric motor also changes greatly. To cope with such a change in force, an electric motor having a large output needs to be provided. In this case, a small-size electric motor cannot be used, and thus, size reduction of the friction clutch is difficult.

In view of this, in the friction clutch disclosed in Patent Document 1, the clutch engagement device is provided with a device for taking up abrasion (abrasion compensation device). The abrasion compensation device is configured to constantly maintain the diaphragm at the same position while the friction clutch is in the engaged state. This configuration can suppress a change in magnitude of the reaction force exerted on the linkage from the diaphragm.

CITATION LIST

Patent Document

Patent Document 1: Japanese Unexamined Patent Application Publication (Translation of PCT Application) No. 2000-501826

SUMMARY OF INVENTION

Through the study of inventors of the present teaching on the normally closed clutch unit, there has arisen a demand for coping with abrasion of the torque transfer member by using a configuration different from that of the abrasion compensation device as described above for the following reasons.

That is, if it is possible to cope with abrasion of the torque transfer member with the configuration different from the abrasion compensation device as described above, the clutch unit can be reduced in cost and size.

In view of this, an object of the present teaching is to obtain a clutch unit capable of coping with abrasion of a torque transfer member with a configuration different from an abrasion compensation device proposed to date. The inventors of the present teaching have conducted various studies on abrasion of a torque transfer member in a normally closed clutch unit. Specifically, study on abrasion of the torque transfer member was conducted for a clutch unit including a clutch including a torque transfer member, an actuator that generates an actuation driving force for actuating the clutch, an auxiliary spring member that generates an assist force for assisting the actuator, and a transfer member for transferring the actuation driving force and the assist force to the clutch. In this study, investigation was conducted on a configuration capable of coping with abrasion of the torque transfer member without compensating for abrasion of the torque transfer member.

The inventors of the present teaching first closely investigated a phenomenon occurring in the clutch, the actuator, and the transfer member in switching the clutch to an engaged state or a disengaged state in a normally closed clutch unit.

Consequently, in switching the clutch from the engaged state to the disengaged state, the timing when an input of a clutch reaction force (a reaction force generated by, for example, the clutch spring) to the transfer member from the clutch starts becomes earlier by abrasion of the torque transfer member. More specifically, it was found that in switching the clutch from the engaged state to the disengaged state, abrasion of the torque transfer member causes a clutch reaction force to be input to the transfer member from the clutch before the assist force generated by the auxiliary spring member is input to the transfer member. Thus, after start of input of the clutch reaction force to the transfer member from the clutch, a period in which the assist force cannot be used for actuating the clutch occurs.

On the other hand, in switching the clutch from the disengaged state to the engaged state, the timing when the clutch reaction force input to the transfer member from the clutch reaches zero becomes later by abrasion of the torque transfer member. More specifically, it was found that in switching the clutch from the disengaged state to the engaged state, abrasion of the torque transfer member causes the assist force input from the auxiliary spring member to the transfer member to be zero before the clutch reaction force input to the transfer member from the clutch becomes zero. Thus, before the clutch reaction force input to the transfer member from the clutch becomes zero, a period in which the assist force cannot be used occurs.

As described above, when the torque transfer member is abraded, a period in which the assist force of the auxiliary spring member cannot be used occurs after start of disengaging operation of the clutch and before completion of engaging operation of the clutch.

Here, if the period in which the assist force cannot be used occurs after start of disengaging operation of the clutch, in order to disengage the clutch, a large actuation driving force needs to be generated by the actuator so as to cope with the clutch reaction force of the clutch. In this case, a large-size actuator is needed, which is not favorable in terms of size reduction of the clutch unit.

In addition, after the start of disengaging operation of the clutch and before the completion of engaging operation of the clutch, the clutch is temporarily in a half-clutch state. In particular, in switching the clutch from the disengaged state to the engaged state, the clutch needs to be controlled precisely in the period in which the clutch is in the half-clutch state. However, when the torque transfer member is abraded as described above, a period in which the assist force of the auxiliary spring member cannot be used occurs before the completion of engaging operation of the clutch. When the clutch changes to the half-clutch state in this period, it is necessary to adjust the actuation driving force precisely while generating a large actuation driving force by the actuator. This is not favorable because of difficulty in control the actuator as well as necessity for providing a large-sized actuator in this case.

In view of this, the inventors of the present teaching have studied a configuration of a clutch unit that can prevent occurrence of a period in which the assist force cannot be used after start of disengaging operation of the clutch and before completion of engaging operation of the clutch even when the torque transfer member is abraded. As a result, the inventors finally found that the clutch unit only needs to be configured as follows.

First, the clutch unit is configured to allow the assist force to be input from the auxiliary spring member to the transfer member before the clutch reaction force is input to the transfer member from the clutch in switching the clutch from the engaged state to the disengaged state. In this case, in switching the clutch to the disengaged state, even if the timing when input of the clutch reaction force to the transfer member from the clutch starts becomes earlier, it is possible to suppress input of the clutch reaction force to the transfer member from the clutch before the assist force is input to the transfer member. That is, it is possible to suppress occurrence of a period in which the assist force cannot be used before start of disengaging operation of the clutch even if the torque transfer member is abraded.

In addition, the clutch unit only needs to be configured to allow the assist force input to the transfer member from the auxiliary spring member to be zero after the clutch reaction force input to the transfer member from the clutch becomes zero in switching the clutch from the disengaged state to the engaged state. In this case, even if the timing when the clutch reaction force input to the transfer member from the clutch reaches zero becomes later in switching the clutch to the engaged state, it is possible to suppress a decrease of the assist force input to the transfer member to zero before the clutch reaction force input to the transfer member from the clutch becomes zero. That is, it is possible to suppress occurrence of a period in which the assist force cannot be used before completion of engaging operation of the clutch even when the torque transfer member is abraded.

Based on the foregoing findings, the inventors arrived at a configuration described below.

A clutch unit according to one embodiment of the present teaching includes: a clutch including a plurality of torque transfer members that transfer a torque by a friction force and a clutch spring that connects the plurality of torque transfer members to one another by an elastic restoring force, the clutch being switchable to an engaged state where a torque is transferred and a disengaged state where a torque is interrupted; an actuator that generates an actuation driving force for actuating the clutch; a transfer member that transfers the actuation driving force generated by the actuator to the clutch and receives the elastic restoring force of the clutch spring from the clutch as a clutch reaction force; and an auxiliary spring member that inputs an assist force for assisting the actuation driving force to the transfer member, wherein in switching the clutch from the engaged state to the disengaged state, the assist force is input to the transfer member from the auxiliary spring member before the clutch reaction force is input to the transfer member from the clutch, and in switching the clutch from the disengaged state to the engaged state, after the clutch reaction force input to the transfer member from the clutch becomes zero, the assist force input to the transfer member from the auxiliary spring member becomes zero.

In the clutch unit, in switching the clutch to the engaged state or the disengaged state, the transfer member receives not only the clutch reaction force exerted from the clutch but also the assist force generated by the auxiliary spring member. Accordingly, an actuation driving force necessary for switching the clutch to the engaged state or the disengaged state can be reduced.

In switching the clutch from the engaged state to the disengaged state, the transfer member receives the assist force from the auxiliary spring member before receiving the clutch reaction force from the clutch. In this case, in switching the clutch from the engaged state to the disengaged state, even if the timing of input of the clutch reaction force to the transfer member from the clutch becomes earlier, it is possible to suppress input of the clutch reaction force to the transfer member from the clutch before the assist force is input to the transfer member. That is, it is possible to prevent occurrence of a period in which the assist force cannot be used before start of disengaging operation of the clutch even if the torque transfer member is abraded.

In addition, in switching the clutch from the disengaged state to the engaged state, the assist force input to the transfer member from the auxiliary spring member becomes zero after the clutch reaction force input to the transfer member from the clutch becomes zero. In this case, even if the timing when the clutch reaction force input to the transfer member from the clutch reaches zero becomes later in switching the clutch from the disengaged state to the engaged state, it is possible to suppress a decrease of the assist force input to the transfer member to zero before the clutch reaction force input to the transfer member from the clutch becomes zero. That is, it is possible to suppress occurrence of a period in which the assist force cannot be used before completion of engaging operation of the clutch even when the torque transfer member is abraded. In this case, it is not necessary to generate a large actuation driving force by a motor or the like in a period before completion of engaging operation of the clutch, that is, a period in which the clutch is in a half-clutch state. Accordingly, the actuation driving force can be adjusted easily.

In the manner described above, in the clutch unit described above, even when the torque transfer members are abraded, the clutch can be smoothly switched to the engaged state or the disengaged state to cope with the abrasion without compensation for the abrasion.

In another aspect, the clutch unit according to the present teaching preferably includes the following configuration: in a state where an abrasion amount of the torque transfer member reaches a predetermined limit, in switching the clutch from the engaged state to the disengaged state, the assist force is input to the transfer member from the auxiliary spring member before the clutch reaction force is input to the transfer member from the clutch, and in switching the clutch from the disengaged state to the engaged state, after the clutch reaction force input to the transfer member from the clutch becomes zero, the assist force input to the transfer member from the auxiliary spring member becomes zero.

Accordingly, even when the abrasion amount of the torque transfer members reaches the predetermined limit, the clutch can be smoothly switched to the engaged state or the disengaged state.

In another aspect, the clutch unit according to the present teaching preferably includes the following configuration: in switching the clutch from the engaged state to the disengaged state, the assist force input to the transfer member from auxiliary spring member is at maximum after start of input of the clutch reaction force to the transfer member from the clutch.

In general, in a predetermined period immediately after start of disengaging operation of the clutch, the clutch reaction force input to the transfer member from the clutch increases as the disengaging operation of the clutch progresses. On the other hand, in the configuration described above, the assist force is at maximum after input of the clutch reaction force to the transfer member from the clutch starts. Accordingly, even when the clutch reaction force input from the clutch to the transfer member increases with the progress of the disengaging operation of the clutch, a sufficient assist force can be input to the transfer member. As a result, the clutch can be smoothly switched from the engaged state to the disengaged state.

In another aspect, the clutch unit according to the present teaching preferably includes the following configuration. In switching the clutch from the disengaged state to the engaged state, the assist force input to the transfer member from auxiliary spring member is at maximum before input of the clutch reaction force to the transfer member from the clutch becomes zero.

Accordingly, in a period before completion of engaging operation of the clutch, that is, a period in which the clutch is in a half-clutch state, a sufficient assist force can be input to the transfer member. Consequently, in the period in which the clutch is in the half-clutch state, engaging operation of the clutch can be smoothly performed with a small actuation driving force.

A vehicle according to one embodiment of the present teaching includes a clutch unit including any one of the configurations described above.

The terminology used herein is for the purpose of describing particular embodiments only and is not intended to be limiting to the invention.

As used herein, the term "and/or" includes any and all combinations of one or more of the associated listed items.

It will be further understood that the terms "including," "comprising" or "having" and variations thereof when used in this specification, specify the presence of stated features, steps, operations, elements, components, and/or their equivalents but do not preclude the presence or addition of one or more other features, steps, operations, elements, components, and/or groups thereof.

It will be further understood that the terms "mounted," "connected," "coupled," and/or their equivalents are used broadly and encompass both direct and indirect mounting, connecting and coupling. Further, "connected" and "coupled" are not restricted to physical or mechanical connections or couplings, and can include electrical connections or couplings, whether direct or indirect.

Unless otherwise defined, all terms (including technical and scientific terms) used herein have the same meaning as commonly understood by one having ordinary skill in the art to which this invention belongs.

It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Embodiments of a clutch unit and a vehicle according to present teaching are discussed herein.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

ADVANTAGEOUS EFFECTS OF INVENTION

The clutch unit according to one embodiment of the present teaching is capable of coping with abrasion of a torque transfer member with a configuration different form that of an abrasion compensation device proposed to date.

BRIEF DESCRIPTION OF THE DRAWINGS

FIG. 9 is a graph schematically showing an example of relationship between an actuator rotation angle and a shaft torque.

FIG. 12 is a cross-sectional view illustrating a friction mechanism in an enlarged manner.

FIG. 13 is a perspective view illustrating a configuration of a rotation transfer portion and a rotation body.

DETAILED DESCRIPTION

Figure 1:
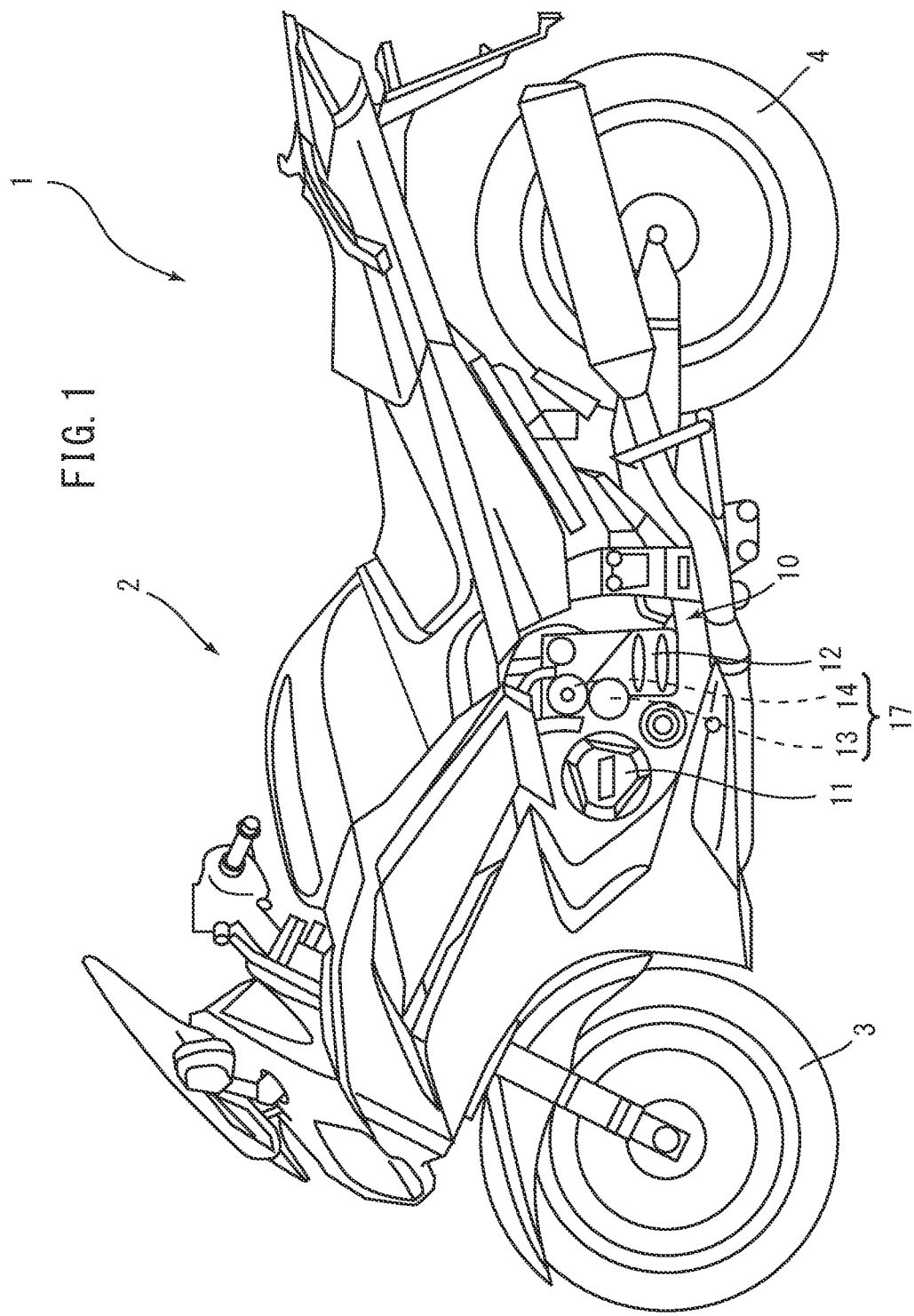
FIG. 1 is a side view of a vehicle including a clutch unit according to a first embodiment of the present teaching.

Embodiments of the present teaching will be described hereinafter with reference to the drawings. The dimensions of components in the drawings do not strictly represent actual dimensions of the components and dimensional proportions of the components.

Overall Configuration

FIG. 1 is a schematic view of a vehicle 1 including a clutch driving device 14 according to a first embodiment of the present teaching. The vehicle 1 is, for example, a motorcycle and includes a vehicle body 2, a front wheel 3, and a rear wheel 4. The vehicle body 2 includes an unillustrated frame. An engine unit 10 for supplying a rotation driving force to the rear wheel 4 is attached to the frame of the vehicle body 2.

The engine unit 10 includes an engine 11, a transmission 12, and a clutch unit 17. The clutch unit 17 includes a clutch 13 and a clutch driving device 14. The clutch 13 is configured to enable transfer of rotation of an unillustrated crank shaft of the engine 11 to the transmission 12. That is, the clutch 13 is configured to be switchable between transfer and non-transfer of rotation of the crank shaft to the transmission 12.

Figure 2A:
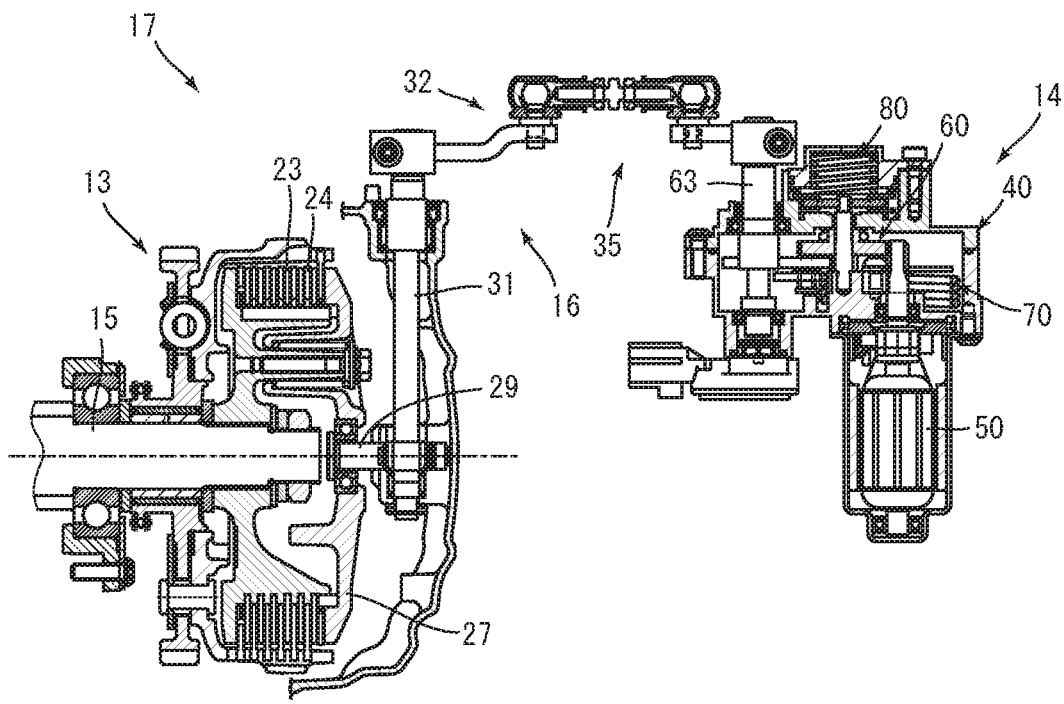
FIG. 2A is a partial cross-sectional view illustrating a schematic configuration of the clutch unit.
Figure 2B:
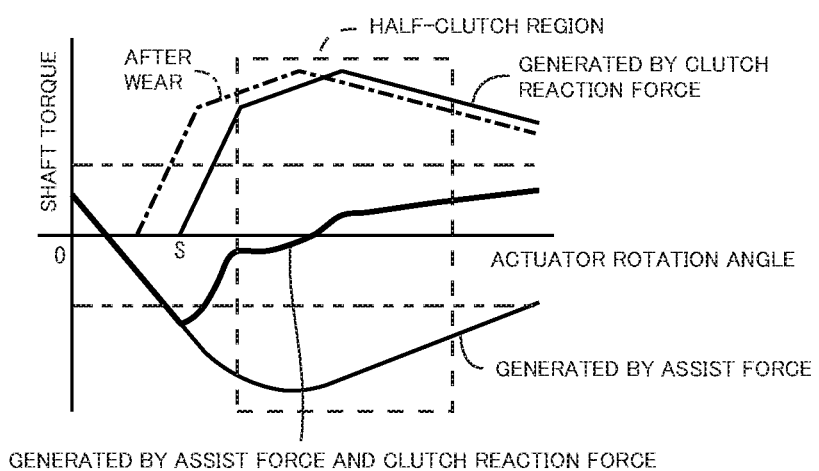
FIG. 2B is a graph schematically showing an example of a relationship between an actuator rotation angle and a shaft torque.
Figure 3:
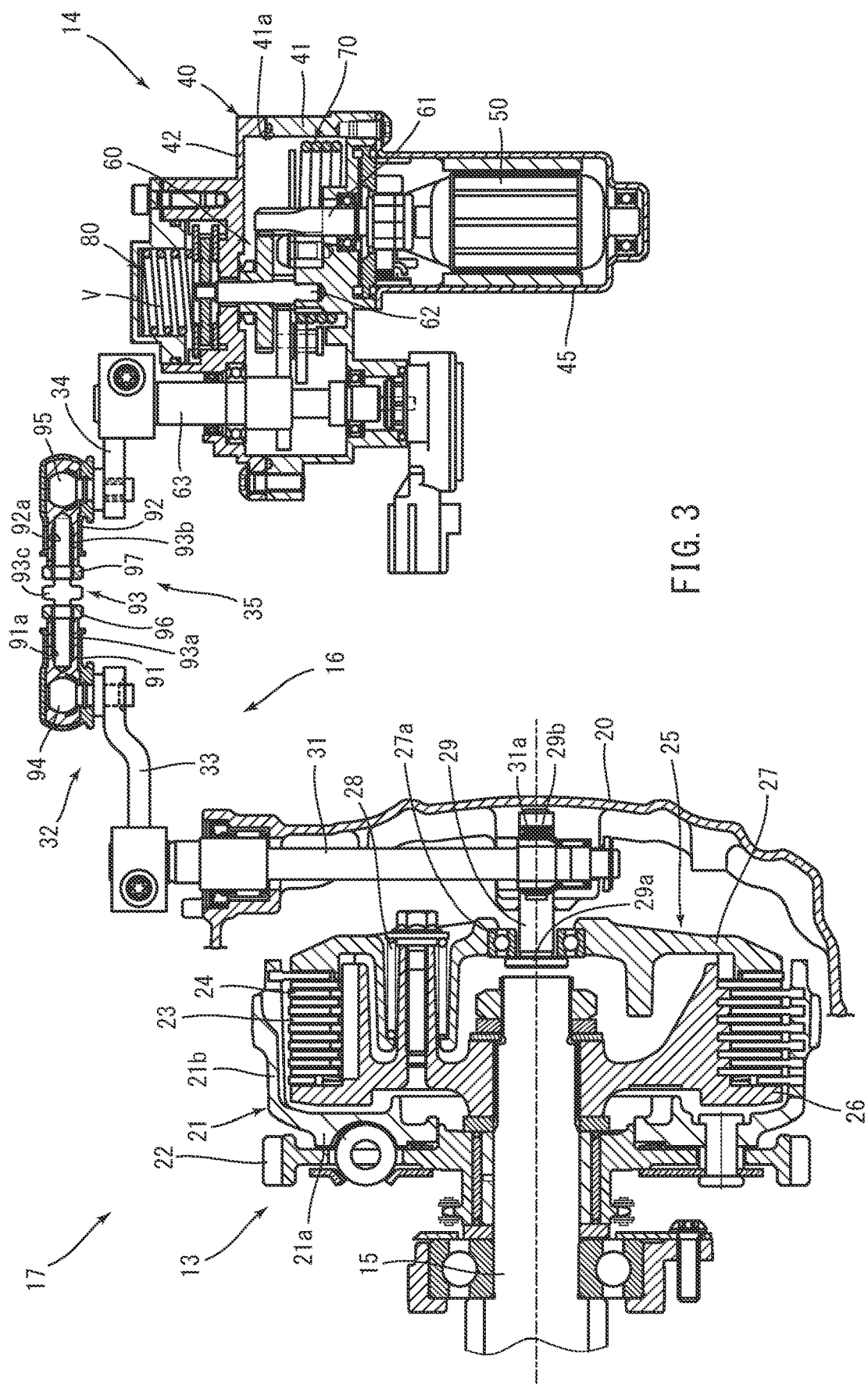
FIG. 3 is a partial cross-sectional view illustrating a schematic configuration of a clutch unit.

FIGS. 2A and 3 are partial cross-sectional view illustrating a schematic configuration of the clutch unit 17. FIGS. 2B and 9 are views schematically illustrating a shaft torque generated in an output shaft 63 of the clutch unit 17 described later. FIGS. 3 and 9 are enlarged views of FIGS. 2A and 2B, respectively. Description for FIG. 9 will be given later.

As illustrated in FIG. 3, the clutch 13 is disposed on a main shaft 15. The main shaft 15 is, for example, an input shaft of the transmission 12. The clutch 13 includes a clutch housing 21 and a clutch inner part 25 disposed inside the clutch housing 21.

The clutch housing 21 has a bottomed cylindrical shape including a bottom portion 21a through which the main shaft 15 penetrates and a cylindrical peripheral wall portion 21b disposed at the outer periphery of the bottom portion 21a. The bottom portion 21a and the peripheral wall portion 21b are integrally formed. The clutch housing 21 is disposed coaxially with the main shaft 15. The clutch inner part 25 is disposed inside the peripheral wall portion 21b of the clutch housing 21.

The bottom portion 21a of the clutch housing 21 is connected to a speed-reducing gear 22. The speed-reducing gear 22 is meshed with a gear (not shown) of the crank shaft to thereby rotate together with the gear. The clutch housing 21 and the speed-reducing gear 22 rotate in accordance with rotation of the crank shaft, and are capable of rotating relative to the main shaft 15.

The clutch inner part 25 includes a clutch boss 26, a pressure member 27, and a clutch spring 28. The clutch boss 26 has a columnar shape, and the main shaft 15 penetrates the center of the columnar shape. The clutch boss 26 is spline-coupled to the outer peripheral surface of the main shaft 15. Accordingly, the clutch boss 26 rotates together with the main shaft 15.

The clutch housing 21, the clutch boss 26, and the pressure member 27 are arranged in this order relative to the main shaft 15 along the axial direction of the main shaft 15 from one end thereof. The pressure member 27 is disposed outside the main shaft 15 in the axial direction to face the clutch boss 26 in the axial direction of the main shaft 15. A plurality of clutch plates 23 and a plurality of friction plates 24 are alternately arranged in the axial direction between the clutch boss 26 and the pressure member 27. The clutch plates 23 and the friction plates 24 correspond to torque transfer members.

The friction plates 24 are provided to the inner peripheral surface of the clutch housing 21 to be rotatable together with the clutch housing 21. The friction plates 24 are rotatable with respect to the clutch boss 26 and the pressure member 27.

The clutch plates 23 are provided to the outer peripheral surface of the clutch boss 26 to be rotatable together with the clutch boss 26. The pressure member 27 is rotatable together with the clutch boss 26. Accordingly, the clutch plates 23 are rotatable together with the pressure member 27. The clutch plates 23 are rotatable with respect to the clutch housing 21.

The pressure member 27 is movable in the axial direction with respect to the clutch boss 26. The clutch spring 28 is disposed to push the pressure member 27 toward the clutch boss 26 in the axial direction. Accordingly, the clutch plates 23 and the friction plates 24 disposed between the clutch boss 26 and the pressure member 27 are pushed against with each other. That is, the clutch spring 28 connects the clutch plates 23 and the friction plates 24 to each other. In the state where the clutch plates 23 and the friction plates 24 described above, friction between the clutch plates 23 and the friction plates 24 causes the clutch boss 26 and the clutch housing 21 to rotate together. This state is an engaged state of the clutch 13.

A push rod 29 penetrates a center portion in the axial direction of the pressure member 27. The push rod 29 is oriented to extend in the axial direction. An end in the axial direction of push rod 29 is provided with a flange portion 29a. The other end of the push rod 29 in the axial direction is connected to the clutch driving device 14 through a link mechanism 16 described later. The push rod 29 is configured to be movable in the axial direction by an output of the clutch driving device 14. In a case where the push rod 29 moves in a direction away from the main shaft 15 (rightward in FIG. 3) in the axial direction, the flange portion 29a of the push rod 29 exerts a force on the pressure member 27 in a direction away from the clutch boss 26 in the axial direction. Accordingly, the clutch spring 28 deforms to be compressed so that a force with which the pressure member 27 presses the clutch plates 23 and the friction plates 24 decreases.

Consequently, a contact pressure between the friction plates 24 and the clutch plates 23 decreases. As a result, engagement between the friction plates 24 and the clutch plates 23 is canceled, and the clutch boss 26 and the clutch housing 21 rotate relative to each other. This state is a disengaged state of the clutch 13.

That is, the clutch 13 is switched between the engaged state and the disengaged state by movement of the push rod 29 in the axial direction.

The pressure member 27 is rotatable with respect to the push rod 29 with a bearing 27a interposed therebetween. Accordingly, in the engaged state of the clutch 13, the pressure member 27 rotates together with the clutch housing 21 and the clutch boss 26.

Link Mechanism

As illustrated in FIGS. 2A and 3, the link mechanism 16 includes a rotating shaft 31 and an arm portion 32. The link mechanism 16 transfers an output of the clutch driving device 14 described later to the push rod 29 of the clutch 13.

One end of the rotating shaft 31 in the axial direction is connected to the other end of the push rod 29 in the axial direction. Specifically, this other end of the push rod 29 in the axial direction is provided with a rack portion 29b having a plurality of teeth arranged in the axial direction. The rotating shaft 31 has a gear 31a that meshes with the rack portion 29b.

With the foregoing configuration, rotation of the rotating shaft 31 causes the push rod 29 to move in the axial direction. That is, the push rod 29 reciprocates in the axial direction in accordance with the rotation direction of the rotating shaft 31.

The rotating shaft 31 is rotatably supported on a casing 20 housing the clutch 13 and the transmission 12, for example.

The arm portion 32 includes a first arm 33, a second arm 34, and an adjustment mechanism 35. Each of the first arm 33 and the second arm 34 is formed in a plate shape elongated in one direction. The first arm 33 is connected to the rotating shaft 31 to be rotatable together with the rotating shaft 31. The second arm 34 is connected to the output shaft 63 of the clutch driving device 14 to be rotatable together with the output shaft 63. The first arm 33 and the second arm 34 are connected to each other through the adjustment mechanism 35.

The arm portion 32 transfers rotation of the output shaft 63 of the clutch driving device 14 to the rotating shaft 31. The arm portion 32 transfers a driving force output from the output shaft 63 of the clutch driving device 14 to the clutch 13, and transfers a reaction force generated by, for example, the clutch spring 28 in the clutch 13 (hereinafter referred to as a clutch reaction force) to the output shaft 63 of the clutch driving device 14. That is, the output shaft 63 receives an output of the clutch driving device 14 and a clutch reaction force generated in the clutch 13.

The adjustment mechanism 35 connects the first arm 33 and the second arm 34 to each other such that the distance between these arms is adjustable. Specifically, the adjustment mechanism 35 includes a first adjustment member 91, a second adjustment member 92, and an adjustment bolt 93.

The first adjustment member 91 is rotatably connected to the first arm 33. The second adjustment member 92 is rotatably connected to the second arm 34. That is, the first adjustment member 91 and the second adjustment member 92 are rotatably connected to the first arm 33 and the second arm 34, respectively, by rod-shaped connection members 94 and 95 each having a spherical portion at one end.

The spherical portions of the connection members 94 and 95 are located inside the first adjustment member 91 and the second adjustment member 92. The connection member 94 extends from the first adjustment member 91 toward the first arm 33, and is fixed to the first arm 33 while penetrating the first arm 33. The connection member 95 extends from the second adjustment member 92 toward the second arm 34, and is fixed to the second arm 34 while penetrating the second arm 34.

The adjustment bolt 93 has a columnar shape elongated in the axial direction. The adjustment bolt 93 has screw portions 93a and 93b at both ends of the adjustment bolt 93 in the axial direction, and the screw portions 93a and 93b have helical grooves. When seen from the screw front end of the screw portion 93b, the direction in which the screw groove extends from the screw front end in the screw portion 93b is opposite to the direction in which the screw groove extends from the screw front end in the screw portion 93a. The adjustment bolt 93 includes a large-diameter portion 93c in a center portion of the adjustment bolt 93 in the axial direction, and the large-diameter portion 93c has a diameter larger than that of the other portion. The large-diameter portion 93c serves as a holding portion in rotating the adjustment bolt 93 as described later.

The first adjustment member 91 and the second adjustment member 92 have screw holes 91a and 92a. When seen from an opening end of the screw hole 92a, the direction in which the screw groove extends from the opening end in the screw hole 92a is opposite to the direction in which the screw groove extends from the opening end in the screw hole 91a. A screw portion 93a provided at one end of the adjustment bolt 93 in the axial direction is screwed to the screw hole 91a. A screw portion 93b provided at the other end of the adjustment bolt 93 in the axial direction is screwed to the screw hole 92a. Thus, the first adjustment member 91 and the second adjustment member 92 are connected to each other by the adjustment bolt 93.

As described above, the screw grooves in the screw portion 93b and the screw hole 92a extend in the direction opposite to that in the screw portion 93a and the screw hole 91a. Thus, rotation of the adjustment bolt 93 with respect to the first adjustment member 91 and the second adjustment member 92 in one way increases a fitting length of the adjustment bolt 93 relative to the first adjustment member 91 and the second adjustment member 92. On the other hand, rotation of the adjustment bolt 93 with respect to the first adjustment member 91 and the second adjustment member 92 in the opposite way reduces the fitting length of the adjustment bolt 93 relative to the first adjustment member 91 and the second adjustment member 92. Accordingly, the positions of the screw portions 93a and 93b of the adjustment bolt 93 relative to the screw holes 91a and 92a of the first adjustment member 91 and the second adjustment member 92 can be adjusted. That is, the first adjustment member 91 and the second adjustment member 92 are connected to each other such that the distance between the first adjustment member 91 and the second adjustment member 92 is adjustable by the adjustment bolt 93.

The first adjustment member 91 and the second adjustment member 92 can be fixed to the adjustment bolt 93 by fastening nuts 96 and 97 to the screw portions 93a and 93b of the adjustment bolt 93 with the distance between the first adjustment member 91 and the second adjustment member 92 adjusted by the adjustment bolt 93.

The configuration of the adjustment mechanism 35 as described above enables adjustment of the distance between the first adjustment member 91 and the second adjustment member 92, that is, between the first arm 33 and the second arm 34. Accordingly, the timing of actuation of the clutch 13 with respect to an operation of the clutch driving device 14 can be changed, which will be described later. That is, for example, in switching the clutch 13 from the engaged state to the disengaged state, the distance between the first arm 33 and the second arm 34 in the link mechanism 16 can be adjusted to change the timing of transfer of an assist force from the clutch driving device 14 to the clutch 13 through the adjustment mechanism 35 with respect to start of disengagement of the clutch 13.

Configuration of Clutch Driving Device

A configuration of the clutch driving device 14 will now be described with reference to FIGS. 3 through 11. The clutch driving device 14 according to this embodiment outputs, to the clutch 13, a driving force obtained by adding an assist force of an assist mechanism 70 to an output of the motor 50 (actuator).

Figure 4:
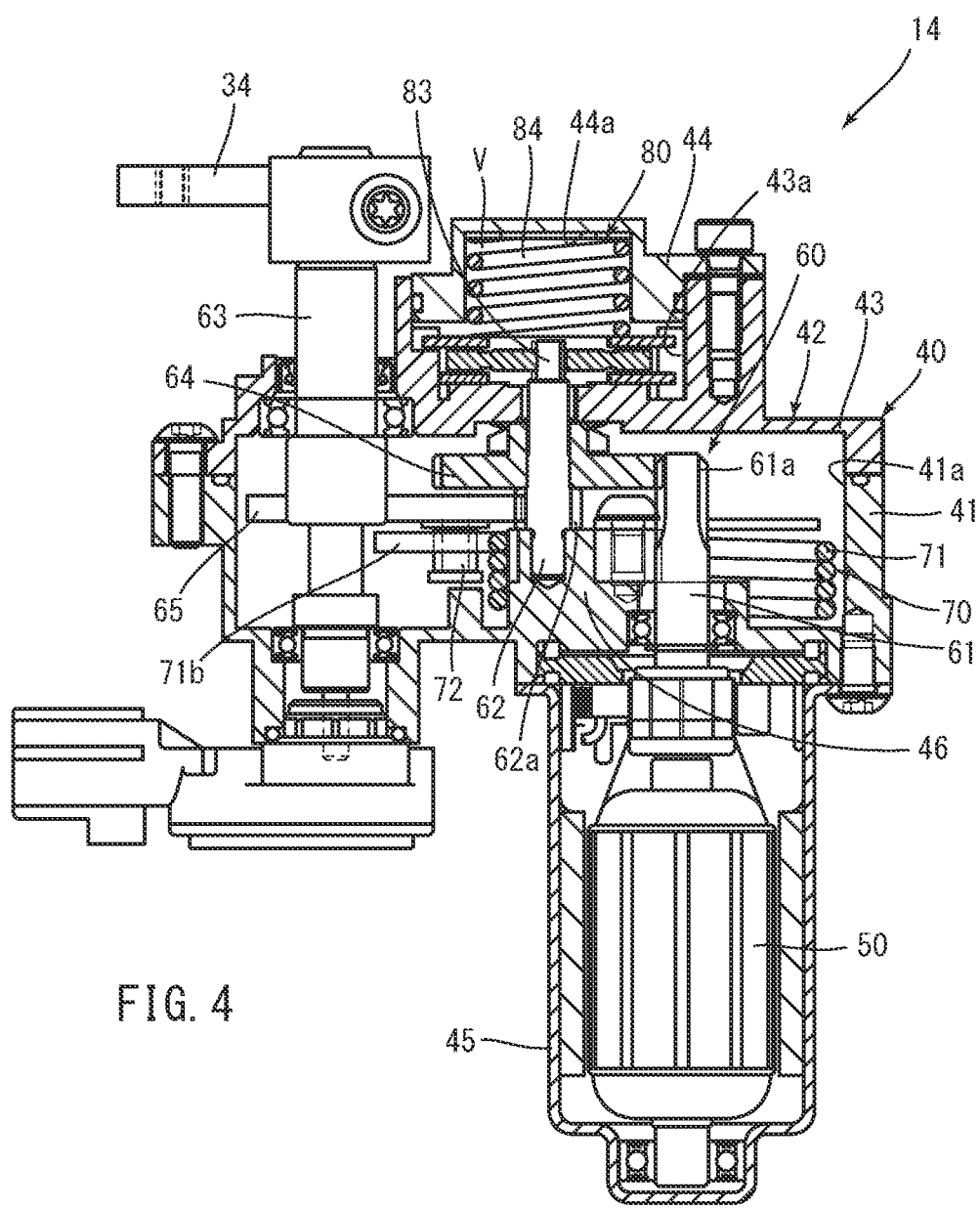
FIG. 4 is a partial cross-sectional view illustrating the clutch driving device in an enlarged manner.

FIG. 4 illustrates a schematic configuration of the clutch driving device 14 in an enlarged manner. As illustrated in FIGS. 3 and 4, the clutch driving device 14 includes the casing 40, the motor 50, a transfer mechanism 60, the assist mechanism 70, and a friction mechanism 80.

Figure 5:
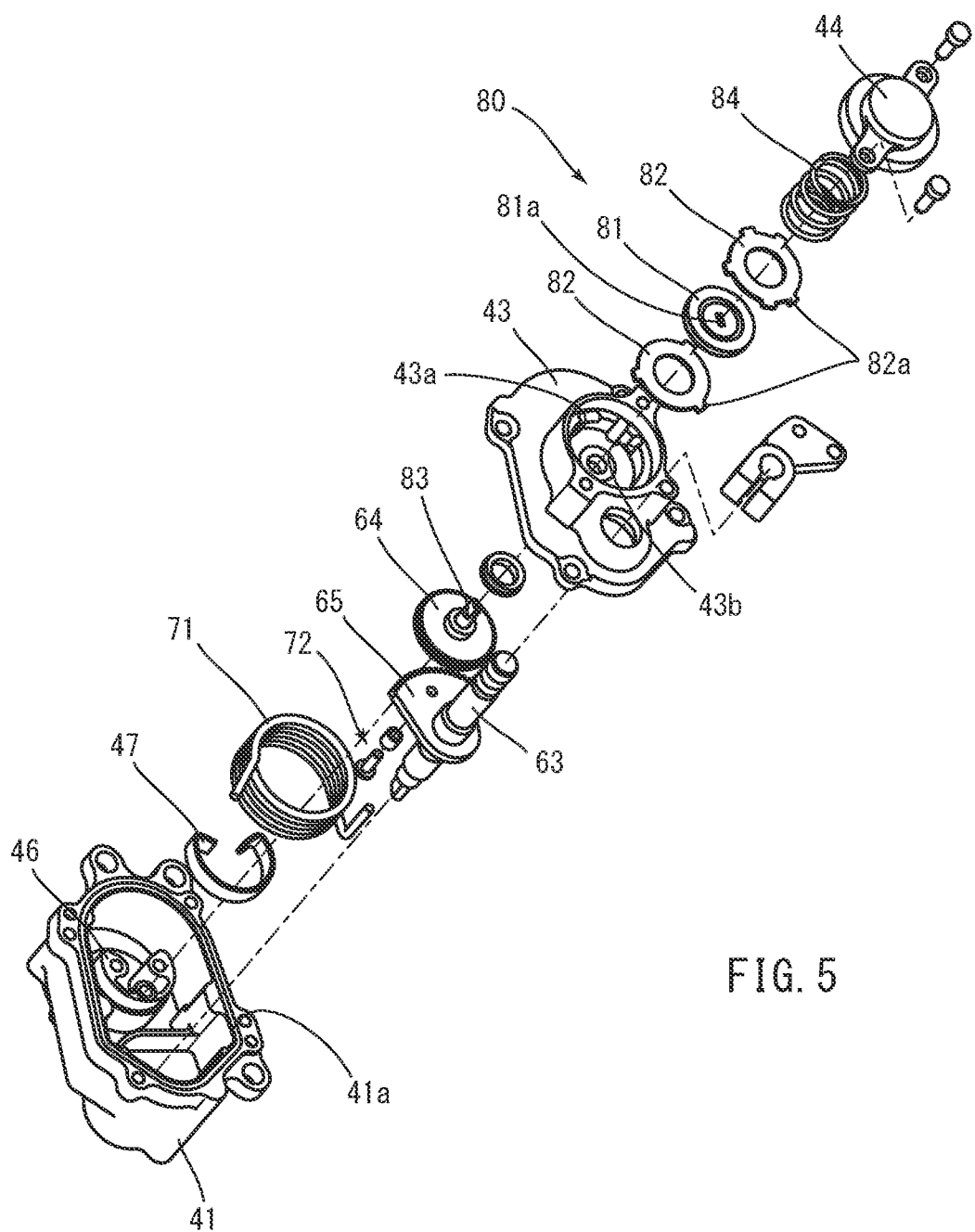
FIG. 5 is a disassembled perspective view of an assist mechanism and a friction mechanism in the clutch driving device.

The casing 40 includes a casing body 41, a cover 42, and a motor compartment 45. FIG. 5 is a disassembled perspective view illustrating a part of the clutch driving device 14 in a disassembled state. As illustrated in FIG. 5, the casing body 41 has a bottomed cylindrical shape extending in a cylinder axial direction. That is, the casing body 41 has an opening 41a. As illustrated in FIGS. 3 and 4, the casing body 41 accommodates the transfer mechanism 60 and the assist mechanism 70. As illustrated in FIG. 5, a protrusion 46 is integrally formed on the bottom of the casing body 41.

As illustrated in FIG. 4, the cover 42 covers the opening 41a of the casing body 41. The cover 42 has storage space V therein. The friction mechanism 80 is disposed in the storage space V. The cover 42 includes a cover body 43 and a storage cover portion 44. The cover body 43 has a first recess 43a constituting a part of the storage space V. The storage cover portion 44 has a second recess 44a constituting the storage space V. The first recess 43a and the second recess 44a constitute the storage space V with the cover body 43 combined with the storage cover portion 44.

The output shaft 63 of the transfer mechanism 60 described later penetrates a portion of the cover 42 different from the portion where the storage space V is formed. The output shaft 63 extends in the cylinder axial direction of the casing body 41 and outward of the casing 40. That is, the axial direction of the output shaft 63 coincides with the cylinder axial direction of the casing body 41.

As illustrated in FIGS. 3 and 4, the motor compartment 45 is connected to the bottom of the casing body 41. Specifically, the motor compartment 45 is attached to the casing body 41 at a position that does not overlap the output shaft 63 when seen in the axial direction of the output shaft 63.

The motor 50 generates an actuation driving force for actuating the clutch 13. The motor 50 is disposed in the motor compartment 45 such that an unillustrated rotating shaft extends along the axial direction.

The transfer mechanism 60 includes an input shaft 61, an intermediate shaft 62, and the output shaft 63 (transfer member). The input shaft 61, the intermediate shaft 62, and the output shaft 63 are disposed in parallel. The input shaft 61 is an output shaft of the motor 50. Thus, the intermediate shaft 62 and the output shaft 63 are disposed in parallel with the output shaft of the motor 50. That is, the input shaft 61 and the intermediate shaft 62 extend along the axial direction of the output shaft 63.

One end of the input shaft 61 in the axial direction is located in the motor compartment 45 housing the motor 50. The other end of the input shaft 61 in the axial direction is located in space defined by the casing body 41 and the cover 42. The other end of the input shaft 61 in the axial direction is provided with a gear 61a having a plurality of teeth arranged in the circumferential direction. In this embodiment, the gear 61a is a spur gear.

One end of the intermediate shaft 62 in the axial direction is rotatably supported on the casing body 41. An intermediate gear 64, which is a spur gear, is provided to the intermediate shaft 62 to be rotatable together with the intermediate shaft 62. The intermediate gear 64 meshes with the gear 61a of the input shaft 61. Accordingly, rotation of the input shaft 61 is transferred to the intermediate shaft 62 through the intermediate gear 64. That is, the intermediate shaft 62 rotates in accordance with rotation of the input shaft 61.

The intermediate shaft 62 is provided with a gear 62a having a plurality of teeth arranged in the circumferential direction at a position closer to a center in the axial direction than the one end of the intermediate shaft 62 rotatably supported on the casing body 41. In this embodiment, the gear 62a is a spur gear closer to one side in the axial direction of the intermediate shaft 62 than the intermediate gear 64 is.

The other end of the intermediate shaft 62 in the axial direction is rotatably supported on the cover 42. This other end of the intermediate shaft 62 in the axial direction is provided with a rotation transfer portion 83 of the friction mechanism 80 described later. Specifically, the other end of the intermediate shaft 62 in the axial direction is provided with the rotation transfer portion 83 having a rectangular shape in cross section (see FIG. 13). A part of the intermediate shaft 62 including the rotation transfer portion 83 (the other end of the intermediate shaft 62 in the axial direction) projects outward of the casing body 41. The rotation transfer portion 83 is inserted in a through hole 81a of a rotation body 81 of the friction mechanism 80 described later (see FIGS. 12 and 13). As described above, by projecting the part of the intermediate shaft 62 including the rotation transfer portion 83 outward of the casing body 41, the friction mechanism 80 can be easily positioned in assembling the friction mechanism 80 to the intermediate shaft 62. Thus, assembly of the clutch driving device 14 can be performed easily. In a case where a torque in the rotation direction exerted on the intermediate shaft 62 is less than or equal to a predetermined value (e.g., a case where an output of the motor 50 is stopped), the friction mechanism 80 reduces rotation of the intermediate shaft 62 by a friction force.

As illustrated in FIG. 4, one end of the output shaft 63 in the axial direction is rotatably supported on the casing body 41, and a center portion of the output shaft 63 in the axial direction is rotatably supported on the cover 42. The other end of the output shaft 63 in the axial direction projects outward of the cover 42. This other end of the output shaft 63 in the axial direction is connected to the second arm 34 of the link mechanism 16 to be rotatable together with the second arm 34. Accordingly, rotation of the output shaft 63 is transferred to the clutch 13 through the link mechanism 16, and a clutch reaction force generated in the clutch 13 is input to the output shaft 63 through the link mechanism 16.

An output gear 65 having a sector shape in plan view is provided to the output shaft 63 to be rotatable together with the output shaft 63. The output gear 65 is a spur gear and meshes with the gear 62a of the intermediate shaft 62. Accordingly, rotation of the intermediate shaft 62 is transferred to the output shaft 63 through the output gear 65. That is, the output shaft 63 rotates in accordance with rotation of the intermediate shaft 62.

As described above, the output shaft 63 receives rotation of the intermediate shaft 62 of the clutch driving device 14 and also receives the clutch reaction force generated in the clutch 13.

An end of the output gear 65 in the thickness direction is provided with a columnar pin 72 projecting in the thickness direction. That is, the pin 72 extends in the axial direction of the output shaft 63. In this embodiment, as illustrated in FIGS. 3 and 4, the pin 72 is provided on one of the surfaces of the output gear 65 in the thickness direction at one side of the output shaft 63 in the axial direction. That is, the pin 72 is provided on the output gear 65 such that the pin 72 extends toward the bottom of the casing body 41 with the output shaft 63 and the output gear 65 disposed in the casing 40. Thus, the pin 72 rotates about the output shaft 63 with rotation of the output gear 65 that rotates together with the output shaft 63. The pin 72 contacts a first projection 71b of a spring 71 of the assist mechanism 70 described later. The pin 72 is rotatable with respect to the output gear 65. Thus, when the pin 72 moves while contacting the first projection 71b of the spring 71 as described later, the pin 72 moves relative to the first projection 71b while rotating.

The assist mechanism 70 includes the spring 71 (auxiliary spring member) and the pin 72 described above. The spring 71 includes a wire material extending helically about an axis. The spring 71 has a cylindrical shape extending in the axial direction. The spring 71 is a so-called torsion spring that generates an elastic restoring force in a circumferential direction by twisting one end of the wire material relative to the other end of the wire material in the circumferential direction. In this embodiment, the wire material for the spring 71 is wound clockwise from a winding start end (first projection 71b) that is one end of the wire material, as illustrated in FIG. 6.

The spring 71 is disposed in the casing body 41 to surround the input shaft 61 and the intermediate shaft 62 when seen in the axial direction of the output shaft 63. The input shaft 61 is inserted in the spring 71. One end of the intermediate shaft 62 in the axial direction is rotatably supported on a part of the casing body 41 (projection 46 described later) located inside the spring 71. The axis of the spring 71 is oriented in parallel with the output shaft 63. One end of the wire material constituting the spring 71 extends toward the output shaft 63.

Figure 6:
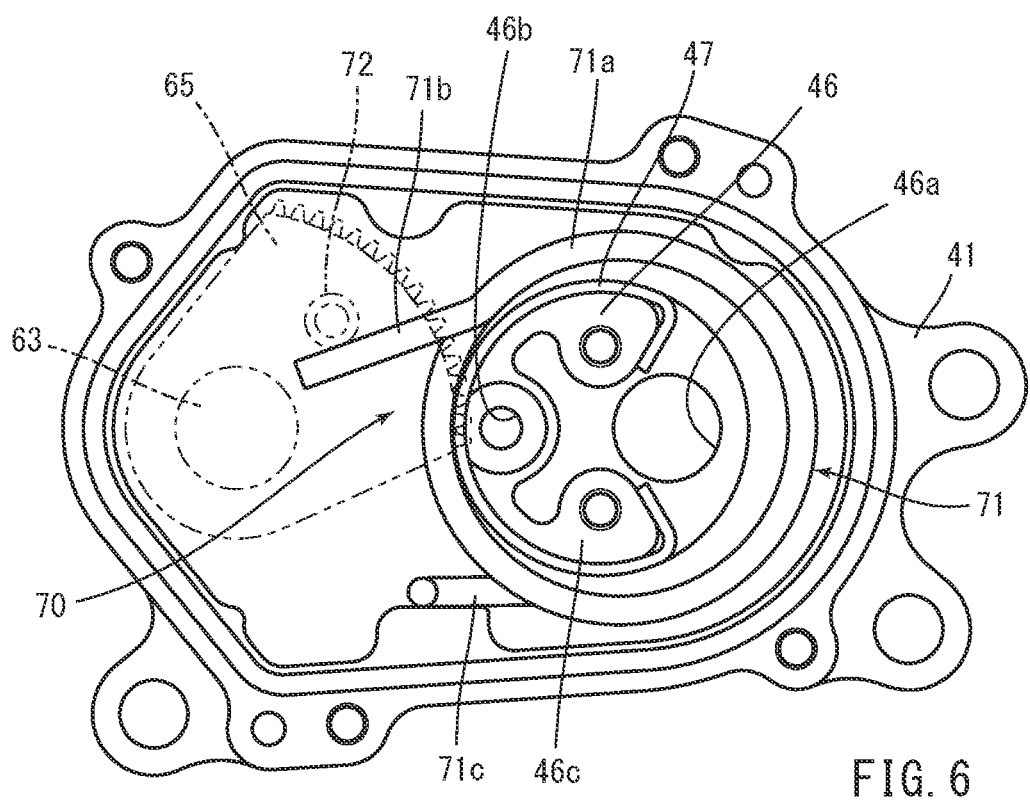
FIG. 6 is a view of the assist mechanism when seen in an axial direction of an output shaft.

FIG. 6 is a view of a schematic configuration of the assist mechanism 70 when seen in the axial direction of the output shaft 63. As illustrated in in FIG. 6, the columnar projection 46 disposed on the inner surface of the casing body 41 is located inside the spring 71. The protrusion 46 has an outer diameter smaller than the inner diameter of the spring 71. The protrusion 46 has a through opening 46*a* in which the input shaft 61 is inserted and an opening portion 46*b* in which one end of the intermediate shaft 62 in the axial direction is inserted.

The spring 71 contacts a portion of the protrusion 46 close to the output shaft 63. A circumferential part of the protrusion 46 including the portion contacting with the spring 71 is provided with a metal contact plate 47 having an arc shape when seen in the axial direction of the output shaft 63. Both ends of the contact plate 47 are fixed to the projection 46*c* of the protrusion 46. The spring 71 contacts the contact plate 47. The contact plate 47 provided on the protrusion 46 can reduce damage of the protrusion 46 by the spring 71 when the spring 71 operates as described later.

One end of the wire material constituting the spring 71 extends toward the output shaft 63 as described above. That is, one end of the wire material extends radially outward of the spring 71. The other end of the wire material of the spring 71 also extends radially outward of the spring 71. That is, the spring 71 includes a cylindrical spring body 71*a*, a first projection 71*b* including one end of the wire material and extending radially outward from the spring body 71*a*, and a second projection 71*c* including the other end of the wire material and extending radially outward from the spring body 71*a*. In this embodiment, the first projection 71*b* and the second projection 71*c* extend toward the output shaft 63 when seen in the axial direction of the output shaft 63.

Figure 7:
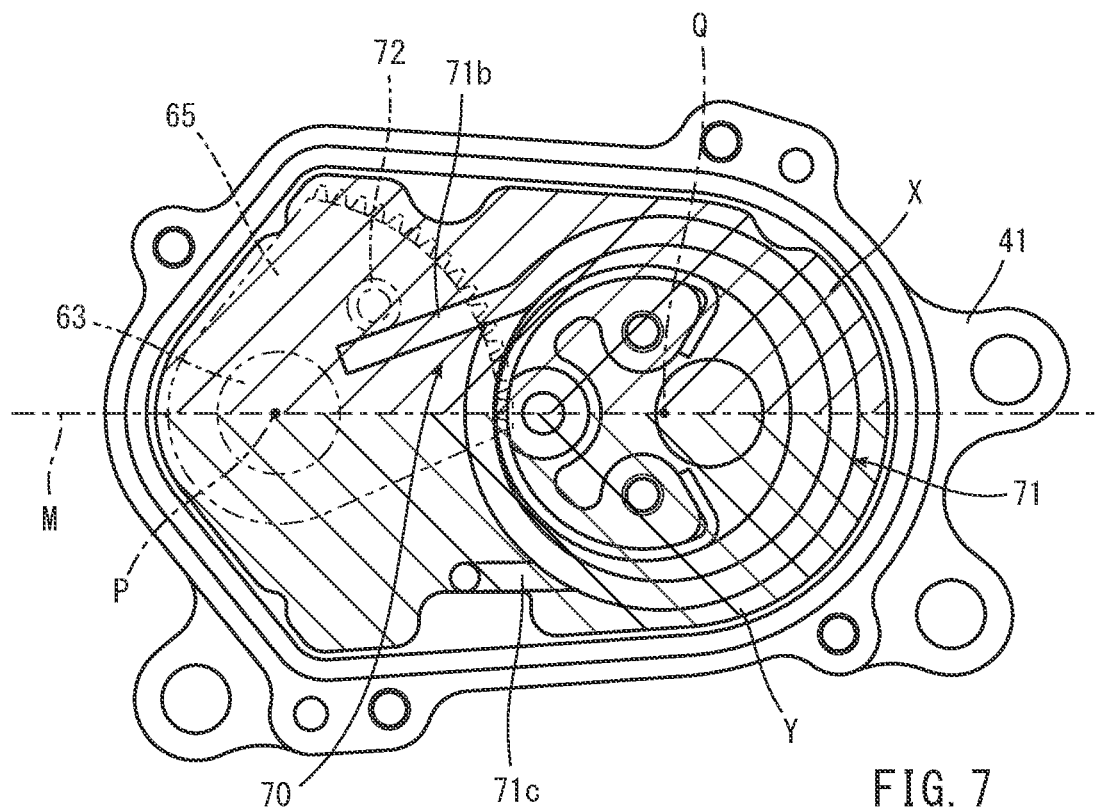
FIG. 7 illustrates regions X and Y in the assist mechanism and corresponds to FIG. 6.

The first projection 71*b* contacts the pin 72 provided on the output gear 65 of the output shaft 63. The second projection 71*c* contacts the inner surface of the casing body 41. As illustrated in FIG. 7, suppose internal space of the casing body 41 is divided into two regions X and Y by an imaginary line M connecting the shaft center P of the output shaft 63 and a center Q (axis) of the spring 71 when seen in the axial direction of the output shaft 63 with the output gear 65 located at a position of a clutch disengaged state as described later. The first projection 71*b* and the second projection 71*c* are located in different regions in the two regions X and Y. That is, as illustrated in FIG. 7, in the state where the output gear 65 is located at a position of the clutch disengaged state, the first projection 71*b* of the spring 71 is located in the region X, whereas the second projection 71*c* is located in the region Y. FIG. 7 is a schematic view corresponding to FIG. 6 and hatching the regions X and Y for description.

Accordingly, in the spring 71, in a case where one end of the wire material in the first projection 71*b* rotates in the circumferential direction of the spring 71 with the second projection 71*c* being in contact with the inner surface of the casing body 41, an elastic restoring force is generated in a direction in which the first projection 71*b* moves away from the second projection 71*c*. That is, in a case where the pin 72 rotates around the axis of the output shaft 63 with rotation of the output shaft 63 in such a manner that the clutch 13 changes from the clutch disengaged state to the engaged state, the first projection 71*b* of the spring 71 is pushed by the pin 72 in the circumferential direction of the spring 71. Accordingly, one end of the wire material of the spring 71 rotates about the axis of the spring 71 to approach the other end of the wire material in the second projection 71*c*. Such deformation of the spring 71 generates an elastic restoring force in the spring 71 in the circumferential direction of the spring 71 in a way in which the first projection 71*b* moves away from the second projection 71*c*.

Figure 8A:
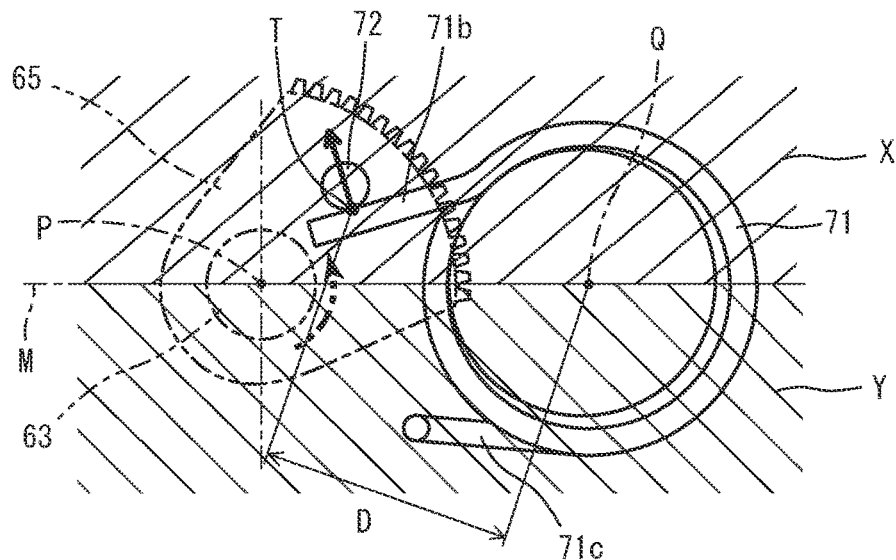
FIG. 8A schematically illustrates an example of operation of the assist mechanism.
Figure 8B:
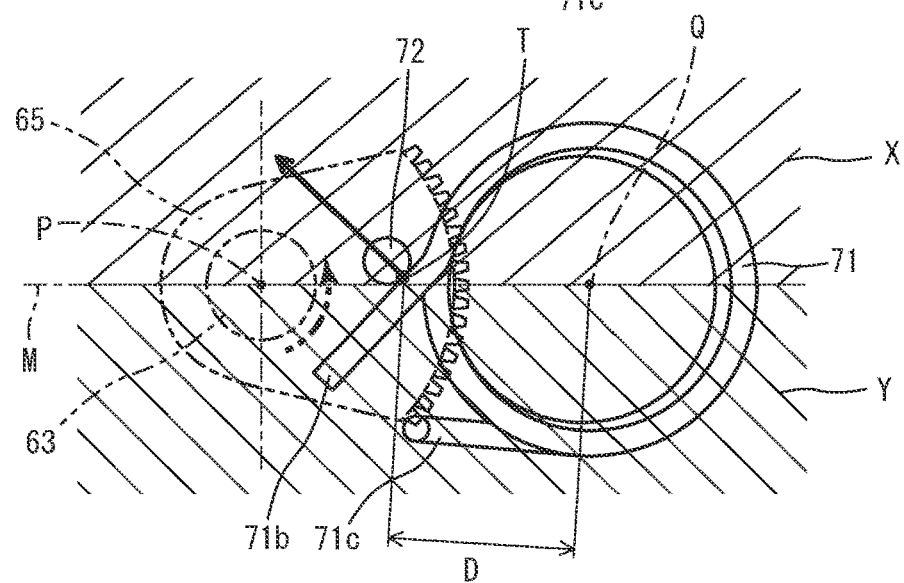
FIG. 8B schematically illustrates an example of operation of the assist mechanism.
Figure 8C:
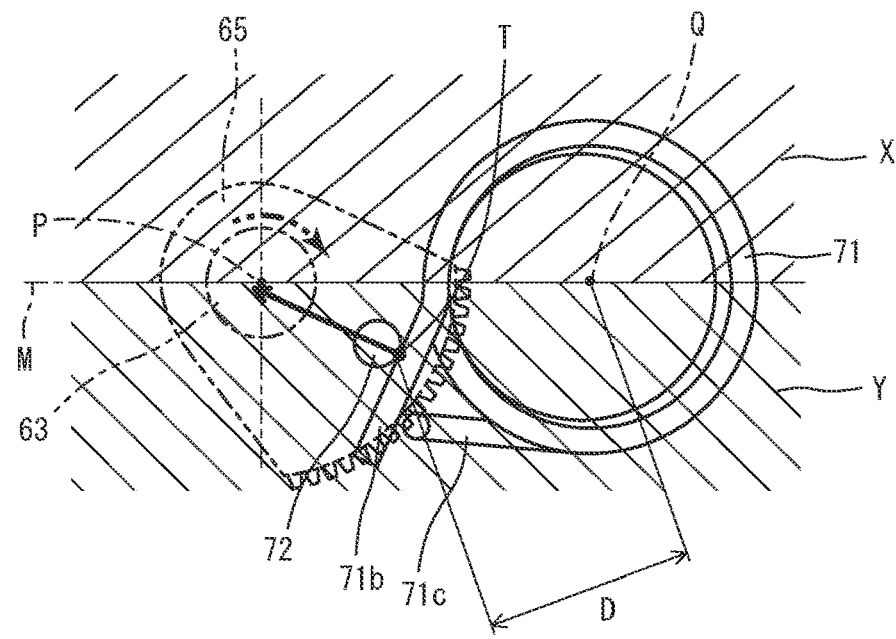
FIG. 8C schematically illustrates an example of operation of the assist mechanism.

FIGS. 8A, 8B, and 8C show schematic views illustrating relationships between the rotation position of the output gear 65 and deformation of the spring 71. In these views, the output shaft 63 and the output gear 65 are represented by dot-dot-dash lines, and only the pin 72 and the spring 71 are represented by continuous lines, for description. In these views, the regions X and Y are hatched for description, in a manner similar to FIG. 7. FIGS. 8A, 8B, and 8C schematically illustrate regions X and Y defined by the imaginary line M for simplifying the drawings.

As illustrated in FIGS. 8A, 8B, and 8C, in a case where the pin 72 rotates about the axis of the output shaft 63 with rotation of the output gear 65, one end of the wire material of the spring 71 contacting the pin 72 is displaced in the circumferential direction of the spring 71 relative to the other end of the wire material. In this case, a contact point T between the pin 72 and the first projection 71*b* including one end of the wire material of the spring 71 reciprocates with respect to the first projection 71*b* along the first projection 71*b*.

FIG. 8A illustrates a rotation position of the output gear 65 when the clutch 13 is in the disengaged state. FIG. 8B illustrates a rotation position of the output gear 65 when the clutch 13 is in a half-clutch state (a state where sliding occurs between the clutch plates 23 and the friction plates 24 but a force in the rotation direction is transferred). FIG. 8C is a rotation position of the output gear 65 when the clutch 13 is in the engaged state.

Specifically, in a case where the output gear 65 is at the rotation position illustrated in FIG. 8A when seen in the axial direction of the output shaft 63, that is, in a case where the pin 72 provided on the output gear 65 is located in the region X in the two regions X and Y obtained by dividing the internal space of the casing body 41 into two by the imaginary line M connecting the shaft center P of the output shaft 63 and the center Q of the spring 71, the pin 72 is in contact with the first projection 71*b* of the spring 71 in a portion close to the front end.

Accordingly, as illustrated in FIG. 8A, a force exerted on the pin 72 by an elastic restoring force of the spring 71 is a force that causes the output gear 65 to rotate in a predetermined direction (also referred to as a rotation direction for clutch disengagement: a rotation direction indicated by an arrow of a dot-dot-dash line in FIG. 8A) such that the clutch 13 is disengaged. That is, the spring 71 applies a torque to the output gear 65 through the pin 72 in the rotation direction for clutch disengagement.

In the case of FIG. 8A, the first projection 71*b* of the spring 71 is not significantly displaced by the pin 72 in the circumferential direction of the spring 71. Thus, a force exerted on the pin 72 by the elastic restoring force of the spring 71 is smaller than those in the case of FIGS. 8B and 8C described later. For example, the pin 72 receives a force in a direction with a magnitude indicated by a solid arrow in FIG. 8A from the first projection 71*b* of the spring 71.

In a case where the output gear 65 is at the rotation position illustrated in FIG. 8B, that is, a case where the pin 72 moves closer to the imaginary line M than the position illustrated in FIG. 7A, the first projection 71*b* of the spring 71 is displaced such that one end of the wire material is located in the region Y, that is, one end of the wire material in the first projection 71*b* approaches the other end of the wire material in the second projection 71*c*. For example, in a case where the output gear 65 changes from the position illustrated in FIG. 8A to the position illustrated in FIG. 8B, the pin 72 approaches the spring body 71*a* while contacting the first projection 71*b* of the spring 71.

Accordingly, the spring 71 is twisted in the circumferential direction. Consequently, the spring 71 generates an elastic restoring force in a direction in which the first projection 71b moves away from the second projection 71c. The elastic restoring force of the spring 71 is exerted on the pin 72 as indicated by the solid arrow in FIG. 8B. That is, the elastic restoring force of the spring 71 is transferred to the output gear 65 through the pin 72 as a torque in the rotation direction for clutch disengagement (the rotation direction indicated by the dot-dot-dash arrow in FIG. 8B). Accordingly, a force of assisting in the rotation direction for clutch disengagement is transferred from the spring 71 to the output gear 65 through the pin 72. At this time, a force exerted on the pin 72 from the first projection 71b of the spring 71 is larger than that in the case of FIG. 8A.

In a case where the output gear 65 is located at a rotation position illustrated in FIG. 8C, that is, in a case where the pin 72 is located in the region Y in the two regions X and Y, the first projection 71b of the spring 71 is displaced by the pin 72 to further approach the other end of the wire material in the second projection 71c. At this time, the pin 72 is located at a position closer to one end of the wire material than the position illustrated in FIG. 8B relative to the first projection 71b of the spring 71.

Accordingly, the spring 71 is further twisted in the circumferential direction. An elastic restoring force of the spring 71 is exerted on the pin 72 as indicated by the solid arrow in FIG. 8C. That is, the elastic restoring force of the spring 71 is exerted on the output gear 65 through the pin 72 in a direction in which the output gear 65 rotates to engage the clutch 13 (hereinafter referred to as a rotation direction for clutch engagement: the rotation direction indicated by a dot-dot-dash arrow in FIG. 8C). Accordingly, a force of assisting in the rotation direction for clutch engagement is transferred from the spring 71 to the output gear 65 through the pin 72.

The contact point T between the pin 72 and the first projection 71b of the spring 71 straddles the imaginary line M connecting the shaft center P of the output shaft 63 and the center Q of the spring 71 when seen in the axial direction of the output shaft 63, in accordance with rotation of the output gear 65. A distance D between the contact point T and the center Q of the spring 71 varies in accordance with rotation of the output gear 65. That is, when seen in the axial direction of the output shaft 63, the distance D is smallest when the contact point T straddles the imaginary line M and increases as the distance to the contact point T from the imaginary line M increases.

FIG. 9 shows relationships between a rotation angle (actuator rotation angle) of the output gear 65 and shaft torques: a torque in a rotation direction in which the torque is exerted on the output shaft 63 by a load in operating the clutch 13 (clutch load) (hereinafter referred to as a shaft torque); a shaft torque exerted on the output shaft 63 by an assist force of the assist mechanism 70; and the sum of a shaft torque generated on the output shaft 63 by a clutch load (clutch reaction force) and a shaft torque generated on the output shaft 63 by an assist force. In FIG. 9, the actuator rotation angle refers to a rotation angle of the output gear 65 with respect to an initial rotation position (the position illustrated in in FIG. 8C) when seen in the axial direction of the output shaft 63 in a case where the output gear 65 rotates counterclockwise from the initial rotation position.

A rotation range of the output gear 65 is defined by the inner surface of the casing body 41. That is, a position at which the output gear 65 contacts the inner surface of the casing body 41 when the output gear 65 rotates in the rotation direction for clutch engagement is a limit rotation position of the output gear 65 in the rotation direction for clutch engagement. A position at which the output gear 65 contacts the inner surface of the casing body 41 when the output gear 65 rotates in the rotation direction for clutch disengagement is a limit rotation position of the output gear 65 in the rotation direction for clutch disengagement.

In the case of this embodiment, the actuator rotation angle increases in a case where the output gear 65 rotates in the order from FIG. 8C, FIG. 8B, and FIG. 8A when seen in the axial direction of the output shaft 63.

The clutch load is equal to a reaction force (clutch reaction force) exerted on the clutch driving device 14 from the clutch spring 28 of the clutch 13, for example, while the clutch 13 operates.

The clutch reaction force increases with an increase in the actuator rotation angle when the clutch 13 switches from the engaged state to the disengaged state. On the other hand, a shaft torque exerted on the output shaft 63 by the clutch reaction force varies to be at maximum at a predetermined actuator rotation angle as indicated by the solid line (solid line with "generated by clutch reaction force" in the drawing) in FIG. 9, depending on a lever ratio determined based on relationship in the position and length between the first arm 33 and the second arm 34 in the link mechanism 16.

Figure 10:
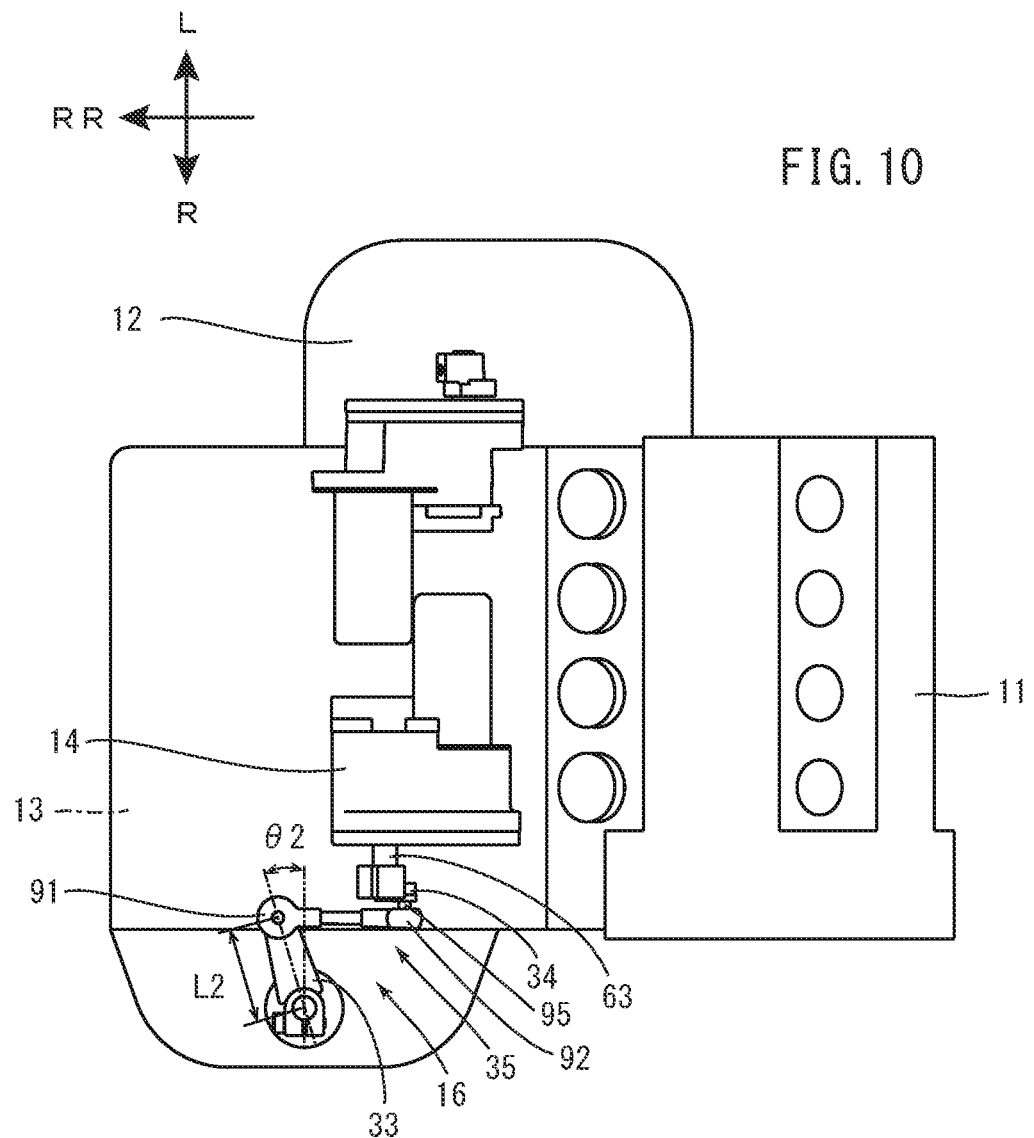
FIG. 10 is a view of an engine and the clutch unit when seen from above a vehicle.
Figure 11:
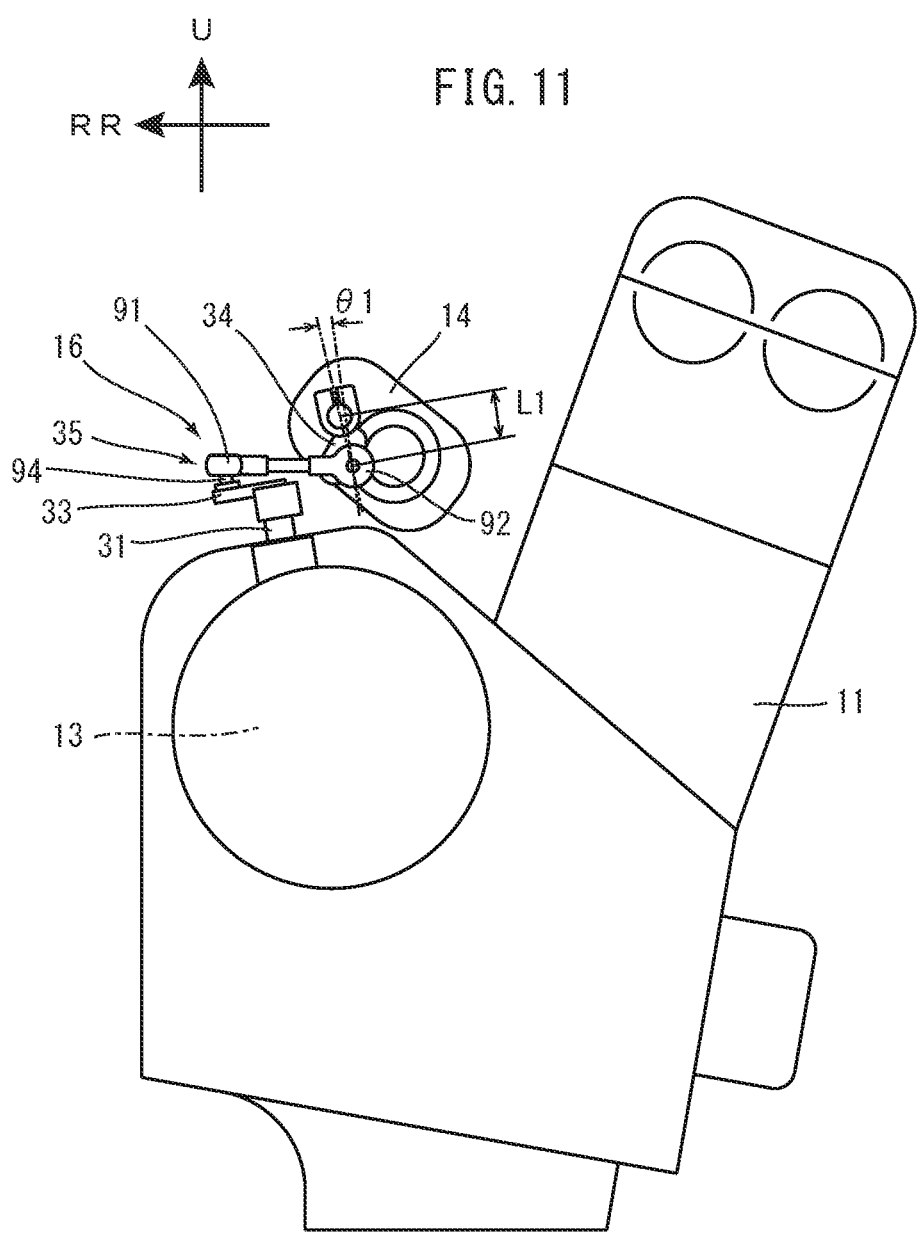
FIG. 11 is a view of the engine and the clutch unit when seen from a side of the vehicle.

The lever ratio will be described below. The lever ratio refers to a ratio between a shaft torque exerted on the output shaft 63 of the clutch driving device 14 and a shaft torque exerted on the rotating shaft 31. In this embodiment, the clutch driving device 14 is disposed relative to the engine 11 and the clutch 13 as illustrated in FIGS. 10 and 11. FIG. 10 is a view schematically illustrating the engine 11, the clutch 13, and the clutch driving device 14 when seen from above the vehicle 1. FIG. 11 is a view schematically illustrating the engine 11, the clutch 13, and the clutch driving device 14 when seen from a side of the vehicle 1. In FIGS. 10 and 11, other components are not shown for description of positional relationship among the engine 11, the clutch 13, and the clutch driving device 14, and the engine 11, the clutch 13, and the clutch driving device 14 are simplified in the illustration.

In FIGS. 10 and 11, arrow L represents a leftward direction of the vehicle 1. Arrow R in the drawings represents a rightward direction of the vehicle 1. Arrow RR in the drawings represents a rearward direction of the vehicle 1. Arrow U in the drawings represents an upward direction of the vehicle 1. The front, the rear, the left, and the right respectively refer to the front, the rear, the left, and the right when seen from a rider driving the vehicle 1.

As illustrated in FIGS. 10 and 11, the clutch driving device 14 is disposed above the clutch 13 and behind the engine 11. The clutch driving device 14 is disposed above the clutch 13 and at the right of the clutch 13 when seen from above the vehicle 1. The clutch driving device 14 is disposed such that the axial direction of the output shaft 63 extends along the left-right direction (lateral direction) of the vehicle 1. The clutch 13 is disposed such that the axial direction of the rotating shaft 31 extends along the top-bottom direction (vertical direction) of the vehicle 1.

The clutch driving device 14 is connected to the clutch 13 through the link mechanism 16. Specifically, one end of the first arm 33 of the link mechanism 16 is connected to the rotating shaft 31 and extends toward the left of the vehicle 1. One end of the second arm 34 of the link mechanism 16 is connected to the output shaft 63 of the clutch driving device 14 and extends toward the bottom of the vehicle 1. The adjustment mechanism 35 of the link mechanism 16 connects the first arm 33 and the second arm 34 to each other such that the first arm 33 and the second arm 34 are rotatable. The first adjustment member 91 and the second adjustment member 92 of the adjustment mechanism 35 are respectively connected to the plate-shaped first arm 33 and the plate-shaped second arm 34 in the thickness direction. Accordingly, the first adjustment member 91 and the second adjustment member 92 are disposed such that the axes of the rod-shaped connection members 94 and 95 are skewed to each other. In FIGS. 10 and 11, the configuration of the link mechanism 16 is simplified.

In the arrangement of the link mechanism 16 as described above, a lever ratio rt that is a ratio between a shaft torque exerted on the output shaft 63 of the clutch driving device 14 and a shaft torque exerted on the rotating shaft 31 is obtained by the equation below. In the equation, the lever ratio rt is obtained on the assumption that a tilt of the adjustment mechanism 35 does not change when the link mechanism 16 operates.

$$rt = \cos\theta 2 / \cos\theta 1 \times L2/L1 \qquad (1)$$

where θ1 is an angle formed by the second arm 34 with respect to a reference line parallel to the axis of the rotating shaft 31 when the link mechanism 16 is seen from a side of the vehicle 1 (see FIG. 11), and θ2 is an angle formed by the first arm 33 with respect to a reference line parallel to the axis of the output shaft 63 when the link mechanism 16 is seen from above the vehicle 1 (see FIG. 10). In addition, L1 is a length of the second arm 34, and L2 is a length of the first arm 33.

In Equation (1), as the angle θ1 of the second arm 34 increases, cos θ1 decreases, and thus, the lever ratio rt increases. Accordingly, when the rotation angle of the output shaft 63 of the clutch driving device 14 increases, the lever ratio rt increases. That is, when the rotation angle (actuator rotation angle) of the output gear 65 that rotates together with the output shaft 63 increases, the lever ratio rt increases.

The clutch reaction force increases as the actuator rotation angle increases, and in a case where the actuator rotation angle is large, the amount of increase in a clutch reaction force with respect to the amount of increase in the actuator rotation angle is small as compared to a case where the actuator rotation angle is small. On the other hand, a shaft torque generated on the output shaft 63 when the clutch reaction force is exerted on the output shaft 63 decreases as the lever ratio rt increases. Thus, the shaft torque decreases as the actuator rotation angle increases.

For the foregoing reasons, as illustrated in FIG. 9, the shaft torque generated on the output shaft 63 by the clutch reaction force increases with an increase in the actuator rotation angle in the case where the actuator rotation angle is small, whereas when the actuator rotation angle exceeds a predetermined actuator rotation angle, the shaft torque decreases with an increase in the actuator rotation angle. That is, the shaft torque varies and is at maximum at the predetermined actuator rotation angle.

In this embodiment, in FIG. 9, in a case where the actuator rotation angle is smaller than S, the clutch 13 is in the engaged state. On the other hand, in FIG. 9, when the actuator rotation angle exceeds S, the clutch 13 shifts from the engaged state to the disengaged state. In FIG. 9, S denotes an actuator rotation angle at which the clutch 13 starts disengagement in a case where the actuator rotation angle increases and also denotes an actuator rotation angle at which engagement of the clutch plates 23 of the clutch 13 and the friction plates 24 finish engagement in a case where the actuator rotation angle decreases.

In FIG. 9, a range where the shaft torque exerted on the output shaft 63 is positive (larger than zero in FIG. 9) is a shaft torque range where the clutch 13 is engaged, and a range where the shaft torque exerted on the output shaft 63 is negative (smaller than zero in FIG. 9) is a shaft torque range where the clutch 13 is disengaged.

In the case where the actuator rotation angle increases, the shaft torque exerted on the output shaft 63 by a clutch reaction force generated in operating the clutch 13 starts being generated at an actuator rotation angle at which the clutch 13 starts shifting from the engaged state to the disengaged state (S in FIG. 9). The shaft torque exerted on the output shaft 63 by the clutch reaction force is generated by a force that causes the output shaft 63 to rotate in a predetermined direction (hereinafter referred to as a rotation direction for clutch engagement) so as to engage the clutch 13. The clutch reaction force is generated by, for example, an elastic restoring force of the clutch spring 28 of the clutch 13.

In the assist mechanism 70, rotation (actuation driving force) of the motor 50 causes the rotation position of the output gear 65 to change such that the actuator rotation angle increases, that is, to change in the order of FIGS. 8C, 8B, and 8A. Accordingly, a force exerted on the pin 72 of the output gear 65 from the spring 71 changes parabolically and is at maximum at a predetermined actuator rotation angle. Consequently, a shaft torque exerted on the output shaft 63 by an assist force of the clutch driving device 14 (indicated by the continuous line represented as "generated by assist force" in FIG. 9) changes parabolically and is also at maximum at the predetermined actuator rotation angle.

As described above, the magnitude of the elastic restoring force of the spring 71 exerted on the pin 72 of the output gear 65 as an assist force in the rotation direction for clutch disengagement varies depending on the rotation position of the output gear 65. This is because a change of the contact point T between the first projection 71b of the spring 71 and the pin 72 along the first projection 71b in accordance with the rotation position of the output gear 65 causes the direction of a force exerted on the pin 72 from the first projection 71b to vary, and also causes the distance D between the contact point T between the pin 72 and the first projection 71b of the spring 71 and the center Q of the spring 71 to vary.

In this embodiment, as illustrated in FIG. 9, the shaft torque exerted on the output shaft 63 by driving of the motor 50 and the assist mechanism 70, that is, the clutch driving device 14, is mainly a shaft torque that disengages the clutch 13 (shaft torque in the negative region in FIG. 9).

In this embodiment, as illustrated in FIG. 9, in switching the clutch 13 from the engaged state to the disengaged state, the assist force is input to the output shaft 63 from the assist mechanism 70 of the clutch driving device 14 before the clutch reaction force is input from the clutch 13. On the other hand, in switching the clutch 13 from the disengaged state to the engaged state, the assist force input to the output shaft 63 from the assist mechanism 70 becomes zero after the clutch reaction force input from the clutch 13 becomes zero.

Specifically, in this embodiment, a force transfer path between the output shaft 63 and the contact portion between the clutch plates 23 and the friction plates 24 is configured such that the timing of transfer of the clutch reaction force to the output shaft 63 and the timing of input of the assist force to the output shaft 63 are different. For example, a predetermined gap is provided between the flange portion 29a of the push rod 29 and the pressure member 27. Accordingly, in a case where a force that moves the pressure member 27 away from the clutch boss 26 is exerted on the push rod 29 by the clutch driving device 14 through the link mechanism 16, the clutch reaction force is input to the output shaft 63 at the timing as described above.

In a case where the clutch plates 23 and the friction plates 24 of the clutch 13 are abraded, the timing when the clutch 13 switches from the engaged state to the disengaged state (start of disengaging operation) becomes earlier and the timing of completion of engagement (completion of engaging operation) of the clutch 13 becomes later, than those of a case where these plates are not abraded. That is, as indicated by the chain line in FIG. 9, the value S of the actuator rotation angle decreases.

In the case where the clutch plates 23 and the friction plates 24 of the clutch 13 are abraded as described above, input of the clutch reaction force and the assist force to the output shaft 63 at the timings described above can prevent occurrence of a period in which the assist force obtained by the assist mechanism 70 cannot be used after start of disengaging operation of the clutch 13 and before completion of engaging operation of the clutch 13.

In the clutch unit 17, even in a case where the abrasion amount of the clutch plates 23 and the friction plates 24 reaches a predetermined limit, the timings of input of the assist force and the clutch reaction force to the output shaft 63 show the relationship as described above. That is, even in the case where the abrasion amount reaches the predetermined limit, in switching the clutch 13 from the engaged state to the disengaged state, the assist force is input to the output shaft 63 from the assist mechanism 70 of the clutch driving device 14 before the clutch reaction force is input from the clutch 13. On the other hand, in switching the clutch 13 from the disengaged state to the engaged state, the assist force input to the output shaft 63 from the assist mechanism 70 becomes zero after the clutch reaction force input from the clutch 13 becomes zero. Accordingly, even when the abrasion amount of the clutch plates 23 and the friction plates 24 reaches the predetermined limit, the clutch 13 can be smoothly switched to the engaged state or the disengaged state.

The predetermined limit may be an abrasion amount of the clutch 13 in a case where the vehicle 1 is used normally (used as expected at the time of design) or an abrasion amount when the clutch 13 starts slipping during travel of the vehicle 1, within a period of lifetime of the vehicle 1 expected at the time of design.

In addition, in this embodiment, in switching the clutch 13 from the engaged state to the disengaged state, the assist force is at maximum after start of input of the clutch reaction force to the output shaft 63 from the clutch 13. As described above, the shaft torque generated on the output shaft 63 by the clutch reaction force is at maximum at a predetermined actuator rotation angle under the influence of the lever ratio. On the other hand, as described above, since the assist force is at maximum after start of input of the clutch reaction force to the output shaft 63, an actuation driving force necessary for actuating the clutch can be effectively reduced by the assist force. Accordingly, the clutch 13 can be smoothly switched from the engaged state to the disengaged state.

Furthermore, in switching the clutch 13 from the disengaged state to the engaged state, the assist force input to the output shaft 63 is at maximum before the clutch reaction force input to the output shaft 63 becomes zero. Accordingly, in a period before completion of engaging operation of the clutch 13, that is, a period in which the clutch 13 is in a half-clutch state, a sufficient assist force can be input to the link mechanism 16. Consequently, in the period in which the clutch 13 is in the half-clutch state, engaging operation of the clutch 13 can be smoothly performed with a small actuation driving force.

With the configuration described above, a shaft torque as the sum of the shaft torque exerted on the output shaft 63 by the assist mechanism 70 and the shaft torque exerted on the output shaft 63 by the clutch reaction force generated in the clutch 13 has a small value relative to an actuator rotation angle, as indicated by the bold line in FIG. 9. That is, the sum of the shaft torques is within a certain range in a half-clutch region illustrated in FIG. 9 (the range of the actuator rotation angle in the half-clutch state). Accordingly, the half-clutch state of the clutch 13 can be obtained in the output shaft 63 by a relatively small and stable shaft torque. The sum of the shaft torques is an actuation driving force of the motor 50 necessary for actuating the clutch 13.

That is, as described above, with an assist force generated by the assist mechanism 70, the clutch 13 can be easily switched from the engaged state to the disengaged state, and a stable half-clutch state can be obtained.

Friction Mechanism

Next, a configuration of the friction mechanism 80 will be described with reference to FIGS. 3 through 5, 12, and 13. FIG. 12 is a view illustrating the friction mechanism 80 in an enlarged manner. In a case where a torque exerted on the intermediate shaft 62 of the transfer mechanism 60 in the rotation direction is a predetermined value or less, the friction mechanism 80 holds the intermediate shaft 62 in a stationary state by friction between the rotation body 81 and a pair of friction plates 82. Accordingly, even when driving of the motor 50 is stopped while the vehicle is stopped, for example, the friction mechanism 80 can hold a disengaged state of the clutch 13.

Specifically, the friction mechanism 80 includes the rotation body 81, the pair of friction plates 82, the rotation transfer portion 83 provided at one end of the intermediate shaft 62, and a spring 84. The friction mechanism 80 is disposed in the storage space V defined in the cover 42 of the clutch driving device 14. Specifically, as also illustrated in FIG. 5, the friction mechanism 80 is disposed between the cover body 43 and the storage cover portion 44. Thus, in this embodiment, as illustrated in FIGS. 3 and 4, the friction mechanism 80 is disposed such that the transfer mechanism 60 is located between the friction mechanism 80 and the motor 50 in the axial direction of the output shaft 63. Accordingly, the friction mechanism 80 can be made compact without interference with the motor 50.

As illustrated in FIGS. 3 through 5 and 12, the pair of friction plates 82 is disposed at both sides in the thickness direction of the rotation body 81. That is, the pair of friction plates 82 and the rotation body 81 are stacked in the order of one friction plate 82, the rotation body 81, and the other friction plate 82 in the thickness direction of the friction plates 82. Each of the friction plates 82 is a hollow disc member. At least one of both surfaces in the thickness of this hollow disc member contacting the rotation body 81 has a friction coefficient with which a predetermined friction force is obtained when the surface contacts the rotation body 81. Specifically, each of the friction plates 82 is made of, for example, a stainless plate member whose surfaces are polished. The pair of friction plates 82 and the rotation body 81 are disposed in the first recess 43a provided in the cover body 43. One of the pair of friction plates 82 is in contact with the inner surface of the first recess 43a of the cover body 43.

As illustrated in FIG. 5, each of the pair of friction plates 82 has a plurality of positioning protrusions 82a on an outer peripheral portion thereof. The positioning protrusions 82a are disposed in positioning recesses 43b formed in the inner surface of the first recess 43a with the pair of friction plates 82 disposed in the first recess 43a of the cover body 43. This configuration can reduce rotation of the pair of friction plates 82 together with the rotation body 81.

The rotation body 81 is a disc-shaped metal member. As illustrated in FIG. 13, the rotation body 81 has a through hole 81a (opening portion) formed in a center portion (rotation center) of the rotation body 81 and penetrating the rotation body 81 in the thickness direction. The through hole 81a is rectangular when seen in the thickness direction of the rotation body 81. The rotation transfer portion 83 disposed at one end of the intermediate shaft 62 penetrates the through hole 81a.

The rotation body 81 has a contact portion 81b located in an outer peripheral portion of the disc-shaped rotation body 81 when seen in the thickness direction, and the contact portion 81b contacts the pair of friction plates 82. The contact portion 81b has a thickness larger than the thickness of a center portion of the rotation body 81. That is, the contact portion 81b projects from the center portion of the rotation body 81 in the thickness direction of the rotation body 81. Accordingly, the contact portion 81b of the rotation body 81 contacts the pair of friction plates 82 with the rotation body 81 disposed between the pair of friction plates 82.

As described above, the rotation transfer portion 83 is disposed at an end of the intermediate shaft 62 in the axial direction. The rotation transfer portion 83 has a columnar shape that is rectangular in cross section. The rotation transfer portion 83 is formed to be insertable in the through hole 81a of the rotation body 81. Accordingly, in a case where the intermediate shaft 62 rotates with the rotation transfer portion 83 inserted in the through hole 81a of the rotation body 81, rotation of the intermediate shaft 62 is transferred to the rotation body 81 through the rotation transfer portion 83. Thus, the friction mechanism 80 generates a friction force in a direction opposite to the rotation direction of rotation transferred by the transfer mechanism 60.

In FIG. 13, character Z is an axis of the intermediate shaft 62. The axial direction in which this axis Z extends is the same direction as the axial direction of the output shaft 63. The expression that the direction of the axis (axial direction) of the intermediate shaft 62 is the same as the axial direction of the output shaft 63 includes a case where these the axial direction of the intermediate shaft 62 is not completely the same as the axial direction of the output shaft 63 as long as rotation can be transferred between the intermediate shaft 62 and the output shaft 63.

The rotation transfer portion 83 provided in the intermediate shaft 62 is inserted in the through hole 81a of the rotation body 81 described above so that friction mechanism 80 is thereby separated from a transfer path of power from the input shaft 61 to the output shaft 63 in the transfer mechanism 60. That is, the friction mechanism 80 is not included in the transfer mechanism 60, but is separated from the transfer mechanism 60.

With the configuration described above, movement of the rotation body 81 relative to the rotation transfer portion 83 in the axial direction of the intermediate shaft 62 can be permitted while rotation of the intermediate shaft 62 is transferred to the rotation body 81 through the rotation transfer portion 83. Accordingly, even in a case where the rotation body 81 is tilted or displaced in the axial direction of the intermediate shaft 62, for example, the rotation body 81 can be relatively displaced from the rotation transfer portion 83.

The spring 84 includes a wire material extending helically about the axis. The spring 84 has a cylindrical shape extending in the axial direction. The spring 84 is a compression spring that generates an elastic restoring force when being compressed in the axial direction. The spring 84 is disposed in the storage cover portion 44 such that the axial direction coincides with the axial direction of intermediate shaft 62. That is, the axis of the spring 84 extends in the same direction as the axial direction of the output shaft 63.

The spring 84 is disposed with respect to the pair of friction plates 82 and the rotation body 81 such that the axis of the spring 84 coincides with the thickness direction of the pair of friction plates 82 and the rotation body 81. One end toward one direction along the axis of the spring 84 contacts one of the pair of friction plates 82 toward the other end in the axial direction. That is, the pair of friction plates 82 and the rotation body 81 are located closer to the rotation transfer portion 83 than the spring 84 is. In addition, one of the pair of friction plates 82 toward the one direction along the axis contacts the inner surface of the first recess 43a of the cover body 43. Accordingly, the spring 84 applies a force on the pair of friction plates 82 and the rotation body 81 in the thickness direction. Thus, the pair of friction plates 82 and the rotation body 81 are pressed in the thickness direction between the spring 84 and the inner surface of the first recess 43a of the cover body 43.

With the foregoing configuration, a friction force is generated between the pair of friction plates 82 and the rotation body 81 pressed by the spring 84 in the thickness direction. Accordingly, a force that suppresses rotation is exerted on the rotation body 81 rotating together with the intermediate shaft 62, by a friction force between the rotation body 81 and the pair of friction plates 82. Thus, in a case where a force in the rotation direction exerted on the intermediate shaft 62 is less than or equal to the friction force between the rotation body 81 and the pair of friction plates 82, the friction force suppresses rotation of the rotation body 81 and the intermediate shaft 62.

As described above, in FIG. 9, the sum of the shaft torque generated by an assist force of the clutch driving device 14 and the shaft torque generated by a clutch reaction force of the clutch 13 (indicated by the bold solid line in FIG. 9) is a shaft torque exerted on the output shaft 63 of the clutch driving device 14. In FIG. 9, a range of a shaft torque with which rotation of the rotation body 81 and the intermediate shaft 62 stops by the friction force between the rotation body 81 and the pair of friction plates 82 is indicated by dot-dot-dash lines. That is, in the shaft torque exerted on the output shaft 63, rotation of the rotation body 81 and the intermediate shaft 62 is suppressed by the friction force between the rotation body 81 and the pair of friction plates 82 in the range indicated by the dot-dot-dash lines (less than or equal to a predetermined value).

In a case where driving of the motor 50 is stopped, the clutch plates 23 and the friction plates 24 are subjected to a force with which the clutch plates 23 and the friction plates 24 are pushed against each other by the clutch spring 28 such that the clutch 13 is engaged. On the other hand, the friction mechanism 80 with the configuration described above provided in the clutch driving device 14 stops operation of the transfer mechanism 60 of the clutch driving device 14 even while driving of the motor 50 is stopped. Accordingly, the clutch 13 does not operate. Thus, with the configuration described above, a self-lock mechanism capable maintaining an operation state (the half-clutch state or the disengaged state) of the clutch 13 without change can be obtained.

In other words, the self-lock mechanism as described above can be obtained by setting a clutch reaction force and an assist force to be input to the output shaft 63 of the clutch driving device 14 such that the sum of the shaft torques generated on the output shaft 63 is the predetermined value or less as illustrated in FIG. 9.

In addition, as described above, insertion of the rotation transfer portion 83 of the intermediate shaft 62 into the through hole 81a of the rotation body 81 allows displacement of the rotation body 81 relative to the intermediate shaft 62 in directions except the rotation direction. Accordingly, even in a case where the intermediate shaft 62 tilts, for example, rotation of the intermediate shaft 62 can be transferred to the rotation body 81 with a tilt of the rotation body 81 prevented. In this manner, it is possible to rotate the rotation body 81 by the intermediate shaft 62 while ensuring contact of the rotation body 81 with the pair of friction plates 82.

Furthermore, with the configuration described above, the rotation body 81, the friction plates 82, and the spring 84 of the friction mechanism 80 assembled in the cover 42 can be attached to the inside of the casing body 41. As a result, workability in assembly of the friction mechanism 80 can be enhanced.

Moreover, the casing housing the friction mechanism 80 is constituted by a part of the cover 42 of the clutch driving device 14. This makes the entire configuration of the clutch driving device 14 compact.

The clutch unit 17 according to this embodiment includes the clutch 13, the motor 50, the output shaft 63, and the spring 71. The clutch 13 includes the plurality of clutch plates 23 and the plurality of friction plates 24 that transfer a torque by a friction force, and the clutch spring 28 connecting the plurality of clutch plates 23 and the plurality of friction plates 24 to one another by an elastic restoring force. The clutch 13 is provided to be switchable between an engaged state where a torque is transferred and a disengaged state where the torque is interrupted. The motor 50 generates an actuation driving force for actuating the clutch 13. The output shaft 63 transfers the actuation driving force generated by the motor 50 to the clutch 13, and receives the elastic restoring force of the clutch spring 28 from the clutch 13 as a clutch reaction force. The spring 71 inputs an assist force for assisting the actuation driving force to the output shaft 63. In switching the clutch 13 from the engaged state to the disengaged state, the assist force is input to the output shaft 63 from the spring 71 before the clutch reaction force is input from the clutch 13. In switching the clutch 13 from the disengaged state to the engaged state, after the clutch reaction force input to the output shaft 63 from the clutch 13 becomes zero, the assist force input to the output shaft 63 from the spring 71 becomes zero.

In the clutch unit 17 described above, in switching the clutch 13 to the engaged state or the disengaged state, not only the clutch reaction force exerted from the clutch 13 but also the assist force generated by the spring 71 is input to the output shaft 63. Accordingly, an actuation driving force necessary for switching the clutch 13 to the engaged state or the disengaged state can be reduced.

In switching the clutch 13 from the engaged state to the disengaged state, before the clutch reaction force is input to the output shaft 63 from the clutch 13, the assist force is input to the output shaft 63 from the spring 71. In this case, in switching the clutch 13 from the engaged state to the disengaged state even if the timing of input of the clutch reaction force to the output shaft 63 from the clutch 13 becomes earlier, it is possible to suppress input of the clutch reaction force to the output shaft 63 from the clutch 13 before input of the assist force to the output shaft 63. That is, even when the clutch plates 23 and the friction plates 24 are abraded, it is possible to prevent occurrence of a period in which the assist force cannot be used after start of disengaging operation of the clutch 13.

In addition, in switching the clutch 13 from the disengaged state to the engaged state, after the clutch reaction force input to the output shaft 63 from the clutch 13 becomes zero, the assist force input to the output shaft 63 from the spring 71 becomes zero. In this case, in switching the clutch 13 from the disengaged state to the engaged state, even if the timing when the clutch reaction force input to the output shaft 63 from the clutch 13 reaches zero becomes later, it is possible to prevent the assist force input to the output shaft 63 from becoming zero before the clutch reaction force input to the output shaft 63 from the clutch 13 becomes zero. That is, even when the clutch plates 23 and the friction plates 24 are abraded, it is possible to prevent occurrence of a period in which the assist force cannot be used before completion of engaging operation of the clutch 13. In this case, it is not necessary to generate a large actuation driving force by the motor 50 in a period before completion of engaging operation of the clutch 13, that is, a period in which the clutch 13 is in a half-clutch state. Accordingly, the actuation driving force can be adjusted easily.

As a result, in the clutch unit 17 described above, even when clutch plates 23 and the friction plates 24 are abraded, the clutch 13 can be smoothly switched to the engaged state or the disengaged state to cope with the abrasion of the clutch plates 23 and the friction plates 24, without compensation for the abrasion.

In a state where the amount of abrasion of the clutch plates 23 and the friction plates 24 reaches a predetermined limit, in switching the clutch 13 from the engaged state to the disengaged state, the assist force is input to the output shaft 63 from the spring 71 before the clutch reaction force is input to the output shaft 63 from the clutch 13. In switching the clutch 13 from the disengaged state to the engaged state, after the clutch reaction force input to the output shaft 63 from the clutch 13 becomes zero, the assist force input to the output shaft 63 from the spring 71 becomes zero.

Accordingly, even when the abrasion amount of the clutch plates 23 and the friction plates 24 reaches the predetermined limit, the clutch 13 can be smoothly switched to the engaged state or the disengaged state.

In switching the clutch 13 from the engaged state to the disengaged state, the assist force input to the output shaft 63 from the spring 71 is at maximum after the clutch reaction force is input to the output shaft 63 from the clutch 13.

In general, in a predetermined period immediately after start of disengaging operation of the clutch 13, the clutch reaction force input to the output shaft 63 from the clutch 13 increases as the disengaging operation of the clutch 13 progresses. On the other hand, in the configuration described above, the assist force is at maximum after input of the clutch reaction force to the output shaft 63 from the clutch 13. Accordingly, even when the clutch reaction force input from the clutch 13 to the output shaft 63 increases with the progress of the disengaging operation of the clutch 13, a sufficient assist force can be input to the output shaft 63. As a result, the clutch 13 can be smoothly switched from the engaged state to the disengaged state.

In switching the clutch 13 from the disengaged state to the engaged state, the assist force input from the spring 71 to the output shaft 63 is at maximum before the clutch reaction force input to the output shaft 63 from the clutch 13 becomes zero.

Accordingly, in a period before completion of engaging operation of the clutch 13, that is, a period in which the clutch 13 is in a half-clutch state, a sufficient assist force can be input to the output shaft 63. Consequently, in the period in which the clutch 13 is in the half-clutch state, engaging operation of the clutch 13 can be smoothly performed with a small actuation driving force.

Other Embodiments

The embodiments of the present teaching have been described above, but the above embodiments are merely examples for carrying out the invention. Thus, the invention is not limited to the embodiments, and the embodiments may be modified as necessary within a range not departing from the gist of the invention.

In the embodiment described above, in switching the clutch 13 from the engaged state to the disengaged state, the assist force is input to the output shaft 63 from the assist mechanism 70 of the clutch driving device 14 before the clutch reaction force is input from the clutch 13. On the other hand, in switching the clutch 13 from the disengaged state to the engaged state, the assist force input to the output shaft 63 from the assist mechanism 70 becomes zero after the clutch reaction force input from the clutch 13 becomes zero. Thus, in the embodiment, for example, the predetermined gap is provided between the flange portion 29a of the push rod 29 and the pressure member 27. Alternatively, the adjustment mechanism 35 of the link mechanism 16 may be adjusted to cause the clutch reaction force and the assist force to be exerted on the output shaft 63 as described above. That is, to obtain the configuration of the embodiment, the adjustment mechanism 35 of the link mechanism 16 may be used. In this case, the adjustment mechanism 35 makes the distance between the first arm 33 and the second arm 34 larger than that in a normal setting so that a shaft torque as shown in FIG. 9 can be obtained as a shaft torque generated in the output shaft 63 by the clutch reaction force.

In the embodiment described above, a typical abrasion compensation device is not provided. Alternatively, in addition to the configuration of the embodiment, the typical abrasion compensation device may be provided in the clutch 13. That is, the clutch 13 may include a mechanism that adjusts the position of the pressure member 27 in order to prevent the value S of the actuator rotation angle from changing in FIG. 9 even when the clutch plates 23 and the friction plates 24 are abraded. The abrasion compensation device may have any configuration as long as the value S in FIG. 9 can be corrected to reduce the influence of abrasion of the clutch plates 23 and the friction plates 24 on operation of the clutch 13 in the case where the abrasion occurs.

In the embodiment, the push rod 29 of the clutch 13 moves in the axial direction of the main shaft 15 by the rotating shaft 31 connected to the link mechanism 16. Alternatively, an output of the clutch driving device 14 may be directly transferred to the rotating shaft 31 without using the link mechanism 16.

Figure 14:
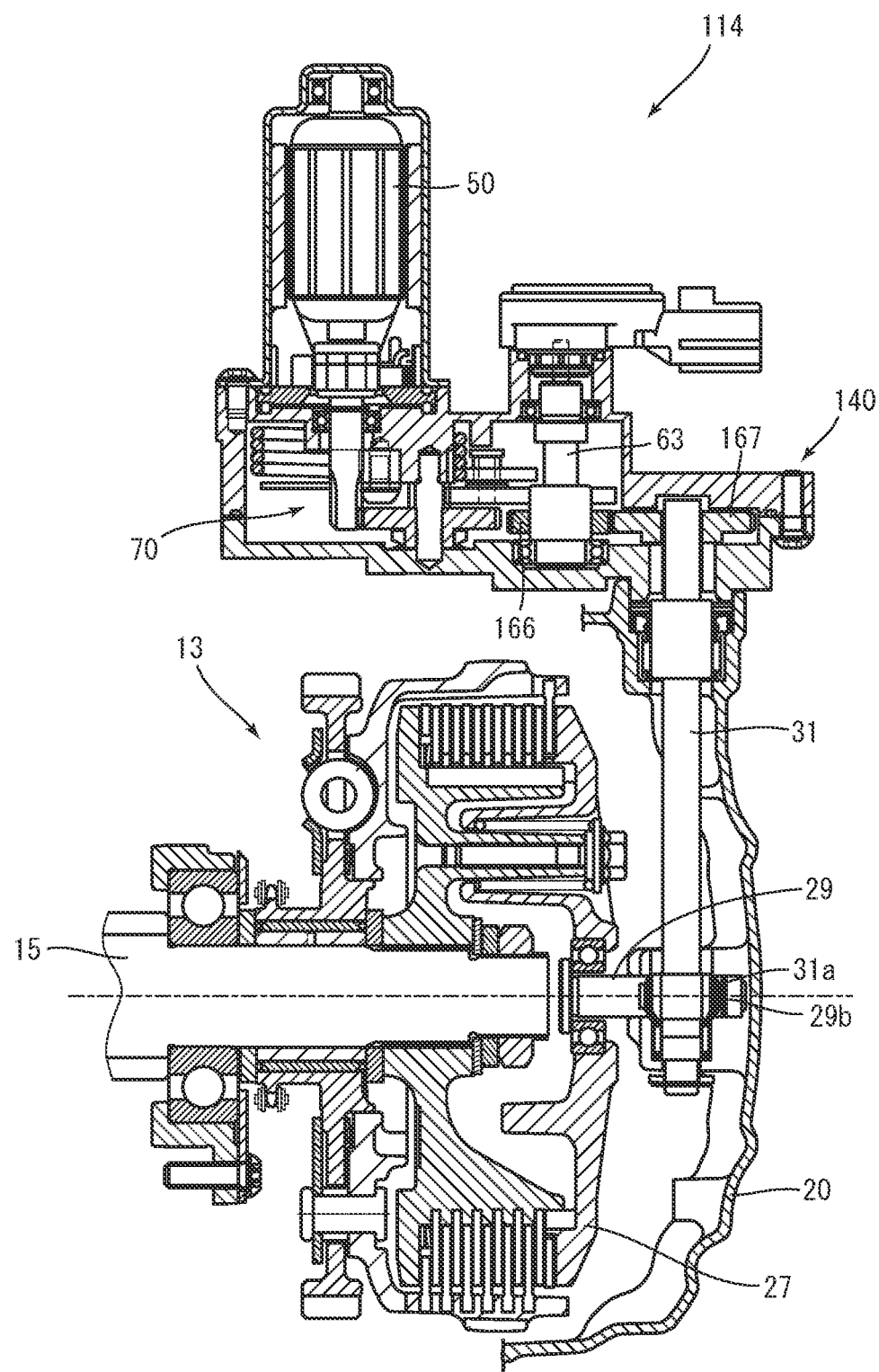
FIG. 14 is a view illustrating a schematic configuration of a clutch unit according to another embodiment and corresponds to FIG. 3.
Figure 15:
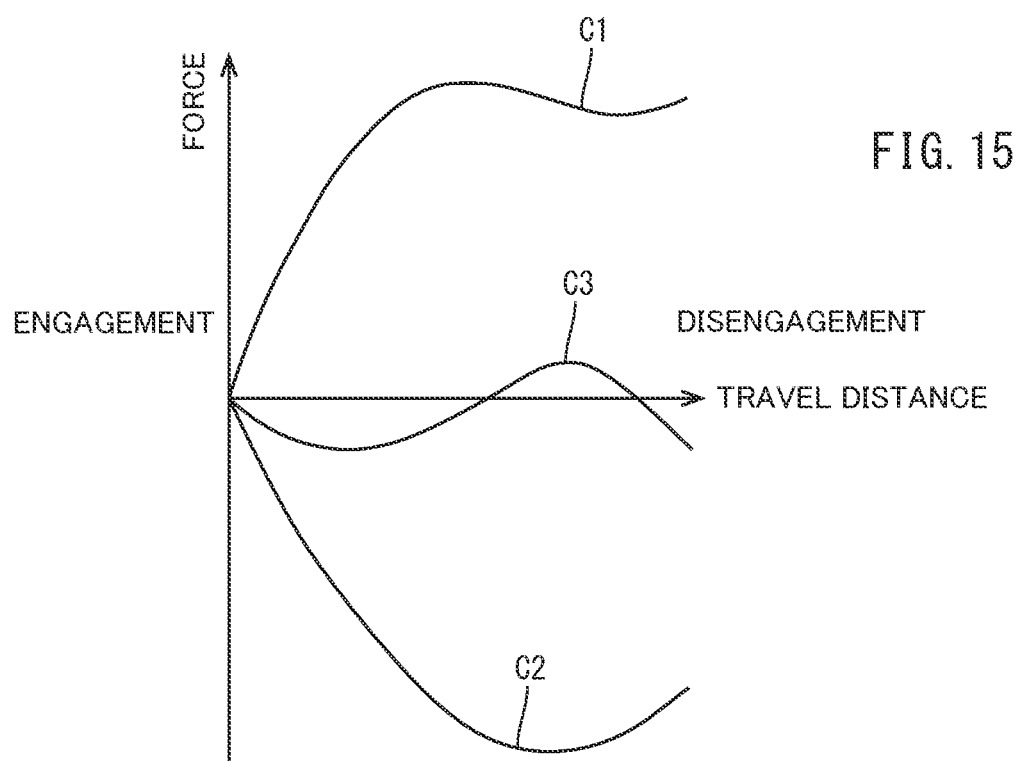
FIG. 15 is a graph for describing forces generated by a diaphragm, an electric motor, and an elastic auxiliary means in a friction clutch in a typical technique.

Specifically, as illustrated in FIG. 14, rotation is directly transferred from the output shaft 63 of the clutch driving device 114 to the rotating shaft 31 through transfer gears 166 and 167. In the following description, components similar to those of the above embodiment are denoted by the same with reference characters and will not be described again, and components different from those of the above embodiment will be described.

The first transfer gear 166 is provided to the output shaft 63 of the clutch driving device 114 to be rotatable together with the output shaft 63. The second transfer gear 167 is provided to the other end of the rotating shaft 31 in the axial direction to be rotatable together with the rotating shaft 31. The first transfer gear 166 and the second transfer gear 167 mesh with each other in a casing 140 of the clutch driving device 114.

Accordingly, rotation of the output shaft 63 of the clutch driving device 114 is transferred to the rotating shaft 31 through the first transfer gear 166 and the second transfer gear 167. When the rotating shaft 31 rotates, the gear provided at one end of the rotating shaft 31 in the axial direction moves relative to the rack portion 29b provided on the push rod 29 so that the push rod 29 thereby moves in the axial direction of the main shaft 15.

In the example illustrated in FIG. 14, the clutch driving device 114 includes no friction mechanism. Alternatively, the clutch driving device 114 may include a friction mechanism with a configuration similar to that of the clutch driving device 14 of the previously-described embodiment.

In the embodiment, the output shaft 63 is used as an example of a transfer member that receives an output of the clutch driving device 14 and a clutch reaction force generated in the clutch 13. The transfer portion member, however, may be a component except the output shaft 63 as long as the component receives outputs of the motor 50 and the assist mechanism 70 and a clutch reaction force generated in the clutch 13, as exemplified by the output gear 65 and the rotating shaft 31.

In the embodiment, even in the state where the abrasion amount of the clutch plates 23 and the friction plates 24 reaches the predetermined limit, in switching the clutch 13 from the engaged state to the disengaged state, the assist force is input to the output shaft 63 from the spring 71 before input of the clutch reaction force from the clutch 13, whereas in switching the clutch 13 from the disengaged state to the engaged state, the assist force from the spring 71 becomes zero after the clutch reaction force input to the output shaft 63 from the clutch 13 becomes zero. However, this relationship does not need to be satisfied at the time when the abrasion amount of the clutch plates 23 and the friction plates 24 reaches the predetermined limit.

In the embodiment, in switching the clutch 13 from the engaged state to the disengaged state, the assist force input from the spring 71 to the output shaft 63 is at maximum after input of the clutch reaction force from the clutch 13 to the output shaft 63. Alternatively, in switching the clutch 13 from the engaged state to the disengaged state, the assist force input from the spring 71 to the output shaft 63 may be at maximum before or at the time of start of input of the clutch reaction force from clutch 13 to the output shaft 63.

In the embodiment, in switching the clutch 13 from the disengaged state to the engaged state, the assist force input from the spring 71 to the output shaft 63 is at maximum before the clutch reaction force input to the output shaft 63 from the clutch 13 becomes zero. Alternatively, in switching the clutch 13 from the disengaged state to the engaged state, the assist force input from the spring 71 to the output shaft 63 may be at maximum after or at the time when the clutch reaction force input to the output shaft 63 from the clutch 13 becomes zero.

In the embodiment, the clutch driving device 14 transfers rotation from the input shaft 61 to the output shaft 63 through the intermediate shaft 62. Alternatively, the input shaft 61 and the output shaft 63 may be configured to transfer rotation directly by a gear.

In the embodiment, the clutch driving device 14 includes the friction mechanism 80 as an example of a self-lock mechanism. However, functions of the self-lock mechanism may be achieved by another configuration. The clutch driving device 14 may not include a self-lock mechanism such as the friction mechanism 80.

In the embodiment, the clutch driving device 14 includes the motor 50 that generates an actuation driving force for actuating the clutch 13. Alternatively, the clutch driving device 14 may include another driving source capable of generating the actuation driving force.

In the embodiment, in the clutch driving device 14, the gears 61a and 62a, the intermediate gear 64, and the output gear 65 that transfer rotation of the input shaft 61 to the output shaft 63 are spur gears. Alternatively, at least one of the gears may be a spur gear and the other may be gears of other shapes. All the gears may be gears other than spur gears.

In the embodiment, the input shaft 61 is provided with the gear 61a, and the intermediate shaft 62 is also provided with the gear 62a. The gear 61a may be integrally provided to the input shaft 61 or may be a member separated from the input shaft 61. The gear 62a may be integrally provided to the intermediate shaft 62 or may be member separated from the intermediate shaft 62.

In the embodiment described above, the spring 71 of the assist mechanism 70 includes the first projection 71b projecting radially outward. The first projection 71b contacts the pin 72 provided on the output gear 65. That is, in the embodiment described above, the contact point T between the first projection 71b and the pin 72 is located radially outside the spring 71. Alternatively, the contact point T may be located radially inside the spring. That is, the first projection may extend radially inward of the spring. The output gear may be located inside the spring or outside the spring when seen in the axial direction of the output shaft 63.

In the embodiment described above, the pin 72 provided on the output gear 65 directly contacts the first projection 71b of the spring 71 in the assist mechanism 70. Alternatively, the output gear may be provided with a link mechanism so that a part of the link mechanism contacts the first projection 71b.

In the embodiment described above, the spring 71 of the assist mechanism 70 includes the first projection 71b and the second projection 71c extending toward the output shaft 63 when seen in the axial direction of the output shaft 63 in a state where the spring 71 is disposed inside the casing 40. Alternatively, the second projection 71c may extend in a direction different from the first projection 71b as long as the second projection 71c can contact the inner surface of the casing body 41 so that the spring 71 is twisted in the circumferential direction when the first projection 71b is displaced by rotation of the output gear 65.

In the embodiment described above, when the spring 71 of the assist mechanism 70 is deformed such that the first projection 71b approaches the second projection 71c, the spring 71 is twisted in the circumferential direction to generate an elastic restoring force. The assist mechanism 70 outputs this elastic restoring force as an assist force for driving of the clutch 13. The assist mechanism, however, may be configured to output an elastic restoring force generated when the spring is deformed to cause the first projection to move away from the second projection as an assist force for actuating the clutch 13.

In the embodiment described above, the clutch driving device 14 includes the assist mechanism 70 including the spring 71 as a torsion spring. The assist mechanism 70, however, may be constituted by a configuration other than the spring 71 as a torsion spring as long as the assist mechanism 70 is capable of outputting an assist force for driving of the clutch 13.

In the embodiment described above, the cylinder axial direction of the casing 40, the axial direction of the input shaft 61, the intermediate shaft 62, and the output shaft 63, and the axial direction of the springs 71 and 84 are the same. Alternatively, the cylinder axial direction of the casing 40, the axial direction of the input shaft 61 and the output shaft 63, and the axial direction of the springs 71 and 84 may be different from one another.

The embodiments described above have been directed to motorcycles as an example of the vehicle 1, but the vehicle 1 may have any configuration such as a three-wheeled vehicle or a four-wheeled vehicle as long as the configuration includes a clutch driving device for driving a clutch.

DESCRIPTION OF REFERENCE CHARACTERS 1 vehicle
13 clutch
14, 114 clutch driving device
15 main shaft
16 link mechanism
17 clutch unit
23 clutch plate (torque transfer member)
24 friction plate (torque transfer member)
27 pressure member
28 clutch spring
32 arm portion
33 first arm
34 second arm
35 adjustment mechanism
40, 140 casing
50 motor (actuator)
60 transfer mechanism
61 input shaft
62 intermediate shaft
63 output shaft (transfer member)
64 intermediate gear
65 output gear
70 assist mechanism
71 spring (auxiliary spring member)
166 first transfer gear
167 second transfer gear

What is claimed is:
1. A clutch unit comprising:
   a clutch including
      a plurality of torque transfer members, including a plurality of clutch plates and a plurality of friction plates, that transfer a torque by a friction force upon the plurality of clutch plates contacting the plurality of friction plates to form a contact portion therebetween, and
      a clutch spring that connects the plurality of torque transfer members to one another by an elastic restoring force,
   the clutch being switchable to an engaged state where the torque is transferred and a disengaged state where the torque is interrupted;
   an actuator that generates an actuation driving force for actuating the clutch;

a transfer member that transfers the actuation driving force generated by the actuator to the clutch and receives the elastic restoring force of the clutch spring from the clutch as a clutch reaction force; and
an auxiliary spring member that inputs an assist force for assisting the actuation driving force to the transfer member, wherein
a force transfer path between the transfer member and the contact portion between the plurality of clutch plates and the plurality of friction plates is so configured that a timing of transfer of the clutch reaction force to the transfer member and a timing of input of the assist force to the transfer member are different in that
  in switching the clutch from the engaged state to the disengaged state, the assist force is input to the transfer member from the auxiliary spring member before the clutch reaction force is input to the transfer member from the clutch, and
  in switching the clutch from the disengaged state to the engaged state, the assist force input to the transfer member from the auxiliary spring member becomes zero after the clutch reaction force input to the transfer member from the clutch becomes zero.

2. The clutch unit according to claim 1, wherein
in a state where an abrasion amount of the torque transfer member reaches a predetermined limit,
  in switching the clutch from the engaged state to the disengaged state, the assist force is input to the transfer member from the auxiliary spring member before the clutch reaction force is input to the transfer member from the clutch, and
  in switching the clutch from the disengaged state to the engaged state, after the clutch reaction force input to the transfer member from the clutch becomes zero, the assist force input to the transfer member from the auxiliary spring member becomes zero.

3. The clutch unit according to claim 2, wherein
in switching the clutch from the engaged state to the disengaged state, the assist force input to the transfer member from auxiliary spring member is at maximum after start of input of the clutch reaction force to the transfer member from the clutch.

4. The clutch unit according to claim 3, wherein
in switching the clutch from the disengaged state to the engaged state, the assist force input to the transfer member from auxiliary spring member is at maximum before input of the clutch reaction force to the transfer member from the clutch becomes zero.

5. A vehicle comprising the clutch unit according to claim 4.

6. A vehicle comprising the clutch unit according to claim 3.

7. The clutch unit according to claim 2, wherein
in switching the clutch from the disengaged state to the engaged state, the assist force input to the transfer member from auxiliary spring member is at maximum before input of the clutch reaction force to the transfer member from the clutch becomes zero.

8. A vehicle comprising the clutch unit according to claim 7.

9. A vehicle comprising the clutch unit according to claim 2.

10. The clutch unit according to claim 1, wherein
in switching the clutch from the engaged state to the disengaged state, the assist force input to the transfer member from auxiliary spring member is at maximum after start of input of the clutch reaction force to the transfer member from the clutch.

11. The clutch unit according to claim 10, wherein
in switching the clutch from the disengaged state to the engaged state, the assist force input to the transfer member from auxiliary spring member is at maximum before input of the clutch reaction force to the transfer member from the clutch becomes zero.

12. A vehicle comprising the clutch unit according to claim 11.

13. A vehicle comprising the clutch unit according to claim 10.

14. The clutch unit according to claim 1, wherein
in switching the clutch from the disengaged state to the engaged state, the assist force input to the transfer member from auxiliary spring member is at maximum before input of the clutch reaction force to the transfer member from the clutch becomes zero.

15. A vehicle comprising the clutch unit according to claim 14.

16. A vehicle comprising the clutch unit according to claim 1.

17. The clutch unit according to claim 1, wherein
the clutch further includes a pressure member,
the clutch unit further includes a push rod that penetrates a center portion of the pressure member in an axial direction thereof, the push rod having a flange portion, the pressure member being rotatable with respect to the push rod, and
the force transfer path is formed to include a gap between the flange portion of the push rod and the pressure member.

18. The clutch unit according to claim 1, wherein
the clutch unit further includes a link mechanism having an adjustment mechanism, the adjustment mechanism including a first arm and a second arm that are apart from each other by a predetermined distance, the second arm being connected to the transfer member, and
the force transfer path is formed to include the adjustment mechanism.

* * * * *